US009843918B2

(12) United States Patent
Luo et al.

(10) Patent No.: US 9,843,918 B2
(45) Date of Patent: Dec. 12, 2017

(54) DEVICE-TO-DEVICE (D2D) DISCOVERY METHOD, BASE STATION, AND USER EQUIPMENT

(71) Applicant: ZTE CORPORATION, Shenzhen, Guangdong Province (CN)

(72) Inventors: Yumin Luo, Shenzhen (CN); Lin Chen, Shenzhen (CN); Ying Huang, Shenzhen (CN); Feng Xie, Shenzhen (CN); Shuyu Ma, Shenzhen (CN); Yulan Liu, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 43 days.

(21) Appl. No.: 14/784,651

(22) PCT Filed: Dec. 31, 2013

(86) PCT No.: PCT/CN2013/091246
§ 371 (c)(1),
(2) Date: Oct. 15, 2015

(87) PCT Pub. No.: WO2014/169695
PCT Pub. Date: Oct. 23, 2014

(65) Prior Publication Data
US 2016/0057604 A1 Feb. 25, 2016

(30) Foreign Application Priority Data

Apr. 16, 2013 (CN) .......................... 2013 1 0130874

(51) Int. Cl.
*H04W 4/00* (2009.01)
*H04W 8/00* (2009.01)
(Continued)

(52) U.S. Cl.
CPC ........... *H04W 8/005* (2013.01); *H04W 48/10* (2013.01); *H04W 72/04* (2013.01)

(58) Field of Classification Search
CPC .................................................... H04W 8/005
See application file for complete search history.

(56) References Cited

U.S. PATENT DOCUMENTS 9,479,918 B2 * 10/2016 Yu .......................... H04W 4/008
2010/0317291 A1 12/2010 Richardson
(Continued)

FOREIGN PATENT DOCUMENTS

CN 102547871 A 7/2012
CN 102547984 A 7/2012
(Continued)

OTHER PUBLICATIONS

Japanese Office Action dated Nov. 1, 2016 for JP Application No. 2016-507979.
(Continued)

*Primary Examiner* — Gerald Smarth
(74) *Attorney, Agent, or Firm* — Plumsea Law Group, LLC

(57) ABSTRACT

A device-to-device (D2D) discovery method, an eNodeB and a user equipment are disclosed. The method includes: a user equipment acquiring discovery signal resources allocated by an eNodeB (eNB) to the user equipment, wherein the discovery signal resources include time-frequency domain resources used for sending or monitoring a discovery signal; and when the user equipment performs a D2D discovery operation, sending or monitoring the discovery signal according to acquired discovery signal resources to perform D2D discovery.

19 Claims, 9 Drawing Sheets

(51) Int. Cl.
   *H04W 48/10*       (2009.01)
   *H04W 72/04*       (2009.01)

(56) References Cited

U.S. PATENT DOCUMENTS

| | | | | |
|---|---|---|---|---|
| 2011/0268101 | A1* | 11/2011 | Wang | H04L 5/0053 370/344 |
| 2012/0059935 | A1 | 3/2012 | Patil et al. | |
| 2013/0010618 | A1 | 1/2013 | Wang et al. | |
| 2013/0051277 | A1 | 2/2013 | Hakola et al. | |
| 2013/0109301 | A1* | 5/2013 | Hakola | H04W 76/023 455/39 |
| 2013/0157670 | A1* | 6/2013 | Koskela | H04W 74/006 455/450 |
| 2013/0272182 | A1* | 10/2013 | Li | H04W 28/02 370/311 |
| 2013/0273924 | A1* | 10/2013 | Hakola | H04W 72/0413 455/450 |
| 2013/0308551 | A1* | 11/2013 | Madan | H04W 72/0406 370/329 |
| 2014/0003262 | A1* | 1/2014 | He | H04W 28/08 370/252 |
| 2016/0014831 | A1* | 1/2016 | Lee | H04W 76/023 370/329 |

FOREIGN PATENT DOCUMENTS

| | | |
|---|---|---|
| CN | 102857901 A | 1/2013 |
| WO | 2013006652 A1 | 1/2013 |
| WO | 2013030773 A1 | 3/2013 |

OTHER PUBLICATIONS

SA WG2 Meeting Notes #96, S2-130979, San Diego, Apr. 8-12, 2013 (9pp).

European Search Report dated Mar. 29, 2016 in European Patent Application No. EP 13882244.0.

* cited by examiner

DEVICE-TO-DEVICE (D2D) DISCOVERY METHOD, BASE STATION, AND USER EQUIPMENT

CROSS-REFERENCE TO RELATED APPLICATION(S)

This application is the U.S. National Phase application of PCT application number PCT/CN2013/091246 having a PCT filing date of Dec. 31, 2013, which claims priority of Chinese patent application 201310130874.4 filed on Apr. 16, 2013, the disclosures of which are hereby incorporated by reference.

BACKGROUND OF THE INVENTION

1. Field of the Invention

The patent document relates to the field of radio communication technology, and particularly, to a device-to-device (D2D) discovery method, an eNodeB and a user equipment.

2. Description of Related Art

With the development of radio multimedia services, people's demand for a high data rate and user experience is increasing, thereby putting forward a higher requirement for system capacity and coverage of a traditional cellular network. On the other hand, the popularity of applications such as a social network, short-distance data sharing and local advertisement and so on makes people's demand for knowing nearby persons or things which they are interested in and communicate with (Proximity Services) increase gradually. The traditional cellular network with the eNodeB as a data transmission node center has apparent limitations in the aspect of supporting the high data rate and proximity services, and in this demand background, the Device-to-Device (D2D) technology representing a new direction for future communication technology development emerges at the right moment. With the application of the D2D technology, the load of the cellular network can be relieved, which reduces the battery consumption of the user equipment, increases the data rate, and improves the robustness of the network infrastructure, thereby meeting the above demand for high data rate services and proximity services well.

With the D2D technology, it can work at an authorized frequency band or a non-authorized frequency band, and allow multiple user equipments supporting a D2D function (i.e. D2D User Equipments (D2D UEs)) to perform direct discovery/direct communication with network infrastructure or without network infrastructure. There are mainly three application scenarios of the D2D.

1) A UE1 and a UE2 performs data interaction under coverage of the cellular network, and data of the user plane do not go through the network infrastructure, as a mode 1 in FIG. 1;

2) It is UE relay transmission in area with weak coverage/ without coverage, as a mode 2 in FIG. 1, a UE4 with worse signal quality is allowed to communicate with the network via a nearby UE3 with network coverage, which can help the operator expand the coverage and enhance the capacity;

3) In a case that an earthquake or emergency situation occurs and the cellular network cannot work normally, direct communication between devices is allowed, as a mode 3 in FIG. 1, both a control plane and a user plane between a UE5, a UE6 and a UE7 perform single-hop or multi-hop data communication without the network infrastructure.

The D2D technology generally includes the D2D discovery technology and the D2D communication technology.

The D2D discovery technology refers to the technology used for judging/determining that two or more D2D user equipments are mutually adjacent (for example, within a range that direct D2D communication can be performed) or used for judging/determining that the first user equipment is adjacent to the second user equipment. Generally, the opposite side can be discovered by sending or receiving discovery signals/information between the D2D user equipments, and under the coverage of the cellular network, the network can assist the D2D user equipments to perform D2D discovery;

the D2D communication technology refers to the technology that part or all of communication data between the D2D user equipments can be directly communicated without the network infrastructure.

When the D2D discovery is performed between the user equipments, it is usually required to send a discovery signal between the user equipments to perform detection, when the opposite side can receive the signal, it indicates that the two user equipments are adjacent, and then discovery between the two user equipments is completed through information interaction with the eNodeB or direct information interaction between the user equipments. At present, in the D2D discovery in a scenario with network coverage, ways of the user equipments acquiring discovery signal resources through competition or an eNB uniformly allocating discovery signal resources to the user equipments are generally adopted, and states of the user equipments and locations of the user equipments in the cell are not considered in all these methods, which easily causes a low signal resource utilization rate and a conflict between signal resources.

SUMMARY OF THE INVENTION

The patent document provides a D2D discovery method, an eNodeB and a user equipment, to improve a reliability of the D2D discovery.

The embodiment of the present invention discloses a D2D discovery method, which comprises:

a user equipment acquiring discovery signal resources allocated by an eNodeB (eNB) to the user equipment, wherein the discovery signal resources comprise time-frequency domain resources used for sending or monitoring a discovery signal; and when the user equipment performs a D2D discovery operation, sending or monitoring the discovery signal according to acquired discovery signal resources to perform a D2D discovery.

Preferably, in the above method, the discovery signal resources further comprise code sequence resources used for sending or monitoring a discovery signal.

Preferably, in the above method, the discovery signal resources allocated by the eNodeB to the user equipment at least comprise one or more of the following:

different discovery signal resources allocated according to states of the user equipment;

different discovery signal resources allocated according to locations of the user equipment;

different discovery signal resources allocated according to application types of the user equipment; and different discovery signal resources allocated according to priorities of the user equipment.

Preferably, in the above method, the user equipment acquiring the discovery signal resources allocated by the eNodeB to the user equipment comprises:

the user equipment receiving a discovery signal resource set broadcasted by the eNodeB; or receiving discovery signal resources allocated by the eNodeB to a present user equipment through a dedicated signaling; or receiving a discovery signal resource set broadcasted by the eNodeB, and after discovery signal resources are selected from the discovery signal resource set, the eNodeB performing coordination and confirmation; or receiving a discovery signal resource set sent by the eNodeB to the present user equipment through a dedicated signaling, and after the user equipment selects discovery signal resources from the discovery signal resource set, the eNB performing coordination and confirmation; or receiving a discovery signal resource set broadcasted by the eNodeB, the user equipment performing measurement with respect to discovery signal resources and making a report to the eNodeB, and the eNodeB selecting an appropriate discovery signal resource for the user equipment according to a measurement result of the user equipment; or receiving a discovery signal resource set sent by the eNodeB to the present user equipment through a dedicated signaling, the user equipment performing measurement with respect to discovery signal resources and making a report to the eNodeB, and the eNodeB selecting an appropriate discovery signal resource for the user equipment according to a measurement result of the user equipment; or receiving discovery signal resources allocated by the eNodeB to the present user equipment by means of combining a broadcast and a dedicated signaling.

Preferably, in the above method, the user equipment receiving the discovery signal resources allocated by the eNodeB to the present user equipment by means of combining a broadcast and a dedicated signaling comprises:

in a set condition, the user equipment receiving a discovery signal resource set broadcasted by the eNodeB, and receiving discovery signal resources allocated by the eNodeB to the present user equipment through a dedicated signaling; or the user equipment receiving a discovery signal resource set broadcasted by the eNodeB, and receiving a discovery signal resource sequence number indication allocated by the eNodeB to the present user equipment through a dedicated signaling, and the user equipment obtaining discovery signal resources allocated to the present user equipment from the discovery signal resource set according to a received sequence number indication.

Preferably, the above method further comprises:

the user equipment and/or other eNodeBs sending a resource request, wherein the resource request comprises the capability of the user equipment and the type of the user equipment; and after receiving the above resource request, the eNodeB allocating discovery signal resources to the user equipment.

Preferably, in the above method, the states of the user equipment comprise a connected state and an idle state.

Preferably, in the above method, the discovery signal resources allocated by the eNodeB according to the states of the user equipment comprise: GROUP A resources and GROUP B resources, wherein, the GROUP A resources are discovery signal resources allocated by the eNodeB to a user equipment in a connected state for use; and the GROUP B resources are discovery signal resources allocated by the eNodeB to a user equipment in an idle state for use.

Preferably, in the above method, the eNodeB dynamically adjusts resources in a GROUP A resource pool and a GROUP B resource pool, comprising: adjusting the quantity of resources in respective resource pool of the GROUP A resource pool and the GROUP B resource pool, and adjusting the intercombination of time-frequency and/or code resources of the resources in the resource pools.

Preferably, in the above method, the locations of the user equipment are that the user equipment is located at a cell edge or a cell center.

Preferably, in the above method, according to different locations of the user equipment in the connected state in the cell, the eNodeB allocates different GROUP A resources;

wherein, the eNodeB allocates a cell-edge GROUP A resource to a user equipment in a connected state located in a cell-edge area; and the eNodeB allocates a cell-center GROUP A resource to a user equipment in a connected state located in a cell-center area.

Preferably, in the above method, the eNodeB allocates a cell-edge GROUP A resource different from a cell-edge GROUP A resource in an edge area of a neighboring cell of the cell to the user equipment in the connected state located in the cell-edge area.

Preferably, in the above method, when a user equipment in a connected state moves to a different cell area, the eNodeB reallocates GROUP A resources belonging to the cell area to the user equipment in the connected state.

Preferably, in the above method, the eNodeB dynamically adjusts resources of various cell-edge GROUP A resource pools and cell-center GROUP A resource pools in the GROUP A resources, comprising: adjusting the quantity of resources in various cell-edge GROUP A resource pools and cell-center GROUP A resource pools, and adjusting the intercombination of time-frequency and/or code resources of the resources in the resource pools.

Preferably, in the above method, when allocating the GROUP A resources, the eNodeB firstly allocates discovery signal resources to a user equipment in a connected state with a high priority.

Preferably, in the above method, the eNodeB allocates GROUP A resources used by a user equipment in a connected state with a low priority to the user equipment in the connected state with the high priority.

Preferably, in the above method, when allocating the GROUP A resources, the eNodeB allocates a service life of the discovery signal resources and a usage pattern of the discovery signal according to the application types of the user equipment;

wherein, the service life of the discovery signal resources is a duration that the GROUP A resources can be used by the user equipment;

the usage pattern of the discovery signal comprises a period of sending the discovery signal, a specific start location or a start and offset location and valid time of continuous sending; or the usage pattern of the discovery signal comprises related information of deducing the usage pattern of the discovery signal.

Preferably, in the above method, after a service life of the GROUP A resources used by the user equipment expires, the eNodeB instructs the user equipment to release the used GROUP A resources, and allocates the GROUP A resources to other user equipments;

or, when the service life of the used GROUP A resources expires and the GROUP A resources are still required to be used, the user equipment proposes a renewal application to the eNodeB, and the eNodeB performs processing on the renewal application;

the processing performed by the eNodeB on the renewal application comprises agreeing a renewal, replacing resources and releasing resources.

Preferably, in the above method, after the GROUP A resources used by the user equipment are released, if it is still required to use the discovery signal, it is required to reapply to the eNodeB.

Preferably, in the above method, the eNodeB instructs a plurality of user equipments to release the used GROUP A resources in any one of the following cases:

a location area in which the user equipment is located is changed, discovery signal resources are insufficient, and an interference problem exists in usage of the discovery signal resources.

Preferably, in the above method, before a service life of GROUP A resources allocated to the user equipment expires, the user equipment sends a message to request for releasing the GROUP A resources in advance, and the eNodeB allocates the GROUP A resources to other user equipments after receiving the message.

Preferably, in the above method, the eNodeB allocates a resource set of the GROUP B resource pool to the user equipment in the idle state.

Preferably, in the above method, the eNodeB sends GROUP B resource set information to a user equipment in an idle state belonging to a cell under the eNodeB by broadcasting;

the user equipment in the idle state receives a GROUP B resource set; and the user equipment in the idle state selects discovery signal resources from the GROUP B resource set to send discovery information.

Preferably, in the above method, the user equipment in the idle state monitors discovery signal resources corresponding to the GROUP B resource set, and selects a resource with a weak interference.

Preferably, in the above method, GROUP B resources selected by the user equipment in the idle state are continually used within the cell.

Preferably, in the above method, the eNodeB presets a usage pattern of the discovery signal in the GROUP B resources;

the usage pattern of the discovery signal comprises a period of sending the discovery signal, a specific start location or a start and offset location and valid time of continuous sending; or the usage pattern of the discovery signal comprises related information of deducing the usage pattern of the discovery signal.

Preferably, in the above method, when using the GROUP B resources, if it is discovered that an interference to other resources and/or other signals is stronger, the user equipment reselects an appropriate GROUP B resource from the GROUP B resource pool; and if interferences of the GROUP B resources selected for multiple times are all stronger, the user equipment can initiate a radio resource control (RRC) connection establishment, enters a connected state, applies to the eNodeB for allocating GROUP A resources to perform a D2D discovery operation, and performs feedback of an indication of interference states of the GROUP B resources to the eNodeB in the meantime.

Preferably, in the above method, a network management system uniformly configures identical GROUP B resource sets and/or different eNodeBs can coordinately allocate identical GROUP B resource sets.

The embodiment of the present invention further discloses a user equipment, which comprises:

an acquisition module, configured to: acquire discovery signal resources allocated by an eNodeB (eNB) to the user equipment, wherein the discovery signal resources comprise time-frequency domain resources used for sending or monitoring a discovery signal; and a processing module, configured to: when the present user equipment is required to perform a D2D discovery operation, send or monitor the discovery signal according to the discovery signal resources acquired by the acquisition module to perform a D2D discovery.

Preferably, in the above user equipment, the discovery signal resources further comprise code sequence resources used for sending or monitoring a discovery signal.

Preferably, in the above user equipment, the acquisition module acquires the discovery signal resources allocated by the eNodeB to the user equipment by means of:

receiving a discovery signal resource set broadcasted by the eNB; or receiving discovery signal resources allocated by the eNB to the present user equipment through a dedicated signaling; or receiving a discovery signal resource set broadcasted by the eNB, and after discovery signal resources are selected from the discovery signal resource set, the eNB performing coordination and confirmation; or receiving a discovery signal resource set sent by the eNB to the present user equipment through a dedicated signaling, and after discovery signal resources are selected from the discovery signal resource set, the eNB performing coordination and confirmation; or receiving a discovery signal resource set broadcasted by the eNB, performing measurement with respect to discovery signal resources and making a report to the eNB, and the eNB selecting an appropriate discovery signal resource for the user equipment according to a measurement result of the acquisition module; or receiving a discovery signal resource set sent by the eNB to the present user equipment through a dedicated signaling, performing measurement with respect to discovery signal resources and making a report to the eNB, and the eNB selecting an appropriate discovery signal resource for the user equipment according to a measurement result of the acquisition module; or receiving discovery signal resources allocated by the eNB to the present user equipment by means of combining a broadcast and a dedicated signaling.

Preferably, in the above user equipment, the processing module is further configured to: send a resource request to the eNodeB to request the eNodeB for allocating discovery signal resources to the present user equipment, wherein the resource request comprises the capability of the user equipment and the type of the user equipment.

The embodiment of the present invention further discloses an eNodeB, which comprises:

a configuration module, configured to: allocate discovery signal resources to a user equipment, wherein the discovery signal resources comprise time-frequency domain resources used for sending a discovery signal; and a transceiving module, configured to: notify the user equipment of the discovery signal resources allocated to the user equipment.

Preferably, in the above eNodeB, the discovery signal resources further comprise code sequence resources used for sending a discovery signal.

Preferably, in the above eNodeB, the discovery signal resources allocated by the configuration module to the user equipment at least comprise one or more of the following:

different discovery signal resources allocated according to states of the user equipment;

different discovery signal resources allocated according to locations of the user equipment;

different discovery signal resources allocated according to application types of the user equipment; and different discovery signal resources allocated according to priorities of the user equipment.

Preferably, in the above eNodeB, the transceiving module notifies the user equipment of the discovery signal resources allocated to the user equipment by means of:

sending a discovery signal resource set by broadcasting; or allocating discovery signal resources to the user equipment through a dedicated signaling; or sending a discovery signal resource set by broadcasting, and after the user equipment makes a selection, performing coordination and confirmation; or sending a discovery signal resource set to the user equipment through a dedicated signaling, and after the user equipment selects discovery signal resources from the discovery signal resource set, performing coordination and confirmation; or sending a discovery signal resource set by broadcasting, and after the user equipment performs measurement with respect to discovery signal resources and makes a report after receiving the discovery signal resource set, selecting an appropriate discovery signal resource for the user equipment according to a measurement result of the user equipment; or sending a discovery signal resource set to the user equipment through a dedicated signaling, and after the user equipment performs measurement with respect to discovery signal resources and makes a report after receiving the discovery signal resource set, selecting an appropriate discovery signal resource for the user equipment according to a measurement result of the user equipment; or allocating discovery signal resources to the user equipment by means of combining a broadcast and a dedicated signaling.

Preferably, in the above eNodeB, the transceiving module allocates the discovery signal resources to the user equipment by means of combining a broadcast and a dedicated signaling by means of:

the transceiving module broadcasting a discovery signal resource set, and in a set condition, allocating discovery signal resources to the user equipment through a dedicated signaling; or the transceiving module broadcasting a discovery signal resource set, and allocating a discovery signal resource sequence number indication to the user equipment through a dedicated signaling, so as to instruct the user equipment to obtain discovery signal resources allocated to the present user equipment from the discovery signal resource set according to a sequence number.

Preferably, in the above eNodeB, the transceiving module is further configured to: receive a resource request sent by the user equipment and/or other eNBs, wherein the resource request comprises the capability of the user equipment and the type of the user equipment; and the configuration module is configured to: after receiving the resource request, allocate discovery signal resources to the user equipment.

Preferably, in the above eNodeB, the configuration module is configured to allocate discovery signal resources according to the states of the user equipment, and the discovery signal resources comprise: GROUP A resources and GROUP B resources, wherein, the GROUP A resources are discovery signal resources allocated by the eNB to a user equipment in a connected state for use; and the GROUP B resources are discovery signal resources allocated by the eNB to a user equipment in an idle state for use.

Preferably, in the above eNodeB, the configuration module is further configured to dynamically adjust resources in a GROUP A resource pool and a GROUP B resource pool, comprising: adjusting the quantity of resources in respective resource pool of the GROUP A resource pool and the GROUP B resource pool, and adjusting the intercombination of time-frequency and/or code resources of the resources in the resource pools.

Preferably, in the above eNodeB, the configuration module is configured to: according to different locations of the user equipment in the connected state in the cell, allocate different GROUP A resources;

wherein, the eNB allocates a cell-edge GROUP A resource to a user equipment in a connected state located in a cell-edge area; and the eNB allocates a cell-center GROUP A resource to a user equipment in a connected state located in a cell-center area.

Preferably, in the above eNodeB, the configuration module is configured to allocate a cell-edge GROUP A resource different from a cell-edge GROUP A resource in an edge area of a neighboring cell of the cell to the user equipment in the connected state located in the cell-edge area.

Preferably, in the above eNodeB, the configuration module is configured to: when a user equipment in a connected state moves to a different cell area, reallocate GROUP A resources belonging to the cell area to the user equipment in the connected state.

Preferably, in the above eNodeB, the configuration module is configured to dynamically adjust resources of various cell-edge GROUP A resource pools and cell-center GROUP A resource pools in the GROUP A resources, comprising: adjusting the quantity of resources in various cell-edge GROUP A resource pools and cell-center GROUP A resource pools, and adjusting the intercombination of time-frequency and/or code resources of the resources in the resource pools.

Preferably, in the above eNodeB, the configuration module is configured to: when allocating the GROUP A resources, firstly allocate discovery signal resources to a user equipment in a connected state with a high priority.

Preferably, in the above eNodeB, the configuration module is configured to allocate GROUP A resources used by a user equipment in a connected state with a low priority to the user equipment in the connected state with the high priority.

Preferably, in the above eNodeB, the configuration module is configured to: when allocating the GROUP A resources, allocate a service life of the discovery signal resources and a usage pattern of the discovery signal according to the application types of the user equipment;

wherein, the service life of the discovery signal resources is a duration that the GROUP A resources can be used by the user equipment;

the usage pattern of the discovery signal comprises a period of sending the discovery signal, a specific start location or a start and offset location and valid time of continuous sending; or the usage pattern of the discovery signal comprises related information of deducing the usage pattern of the discovery signal.

Preferably, in the above eNodeB, the configuration module is configured to: when the user equipment sends an indication that a service life of the used GROUP A resources expires, instruct the user equipment to release the used GROUP A resources, and allocate the GROUP A resources to other user equipments;

or, when the user equipment proposes a renewal application to the present eNodeB, perform processing on the renewal application;

the processing performed by the configuration module on the renewal application comprises agreeing a renewal, replacing resources and releasing resources.

Preferably, in the above eNodeB, the transceiving module is further configured to instruct a plurality of user equipments to release the used GROUP A resources in any one of the following cases:

a location area in which the user equipment is located is changed, discovery signal resources are insufficient, and an interference problem exists in usage of the discovery signal resources.

Preferably, in the above eNodeB, the transceiving module is further configured to receive a message request of releasing the GROUP A resources in advance sent by the user equipment;

the configuration module is further configured to: after the present eNodeB receives the message request, allocate the GROUP A resources to other user equipments.

Preferably, in the above eNodeB, the configuration module is configured to allocate a resource set of the GROUP B resource pool to the user equipment in the idle state.

Preferably, in the above eNodeB, the transceiving module is configured to send GROUP B resource set information to a user equipment in an idle state belonging to a cell under the eNodeB by broadcasting.

Preferably, in the above eNodeB, the configuration module presets a usage pattern of the discovery signal in the GROUP B resources;

the usage pattern of the discovery signal comprises a period of sending the discovery signal, a specific start location or a start and offset location and valid time of continuous sending; or the usage pattern of the discovery signal comprises related information of deducing the pattern of the discovery signal.

With the scheme of using the discovery signal resources in the D2D discovery process provided in the technical scheme of the embodiment, it not only can be flexibly applied to various scenarios of the D2D discovery, but also can reduce the conflict of resource usage, thereby improving a reliability of the D2D discovery. Moreover, with the method of using the discovery signal resources in the D2D discovery process provided in the embodiment, it also can be convenient for the eNB to uniformly manage the discovery signal resources.

BRIEF DESCRIPTION OF THE DRAWINGS

Here, the described accompanying drawings are used to provide an understanding of the embodiments of the present invention and constitute a part of the patent document. The schematic embodiments and illustrations thereof of the patent document are used to explain the patent document, but do not constitute an inappropriate limitation on the patent document. In the drawings.

DETAILED DESCRIPTION

Figure 1:
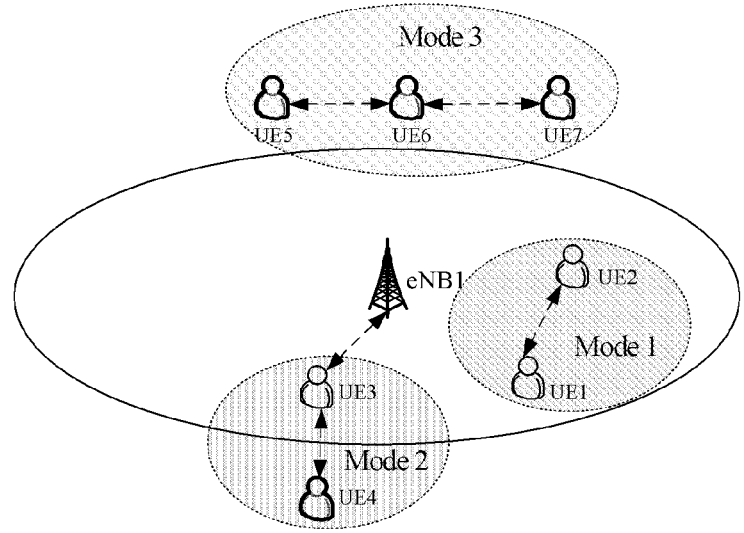
FIG. 1 is an application scenario diagram of the D2D.

The technical scheme of the embodiments of the present invention will be described in detail in combination with the accompanying drawings below. It should be noted that the embodiments in the present application and the characteristics in the embodiments can be optionally combined with each other in the condition of no conflict.

Embodiment 1

The embodiment provides a D2D discovery method, which includes the following operations:

a user equipment acquiring discovery signal resources allocated by an eNodeB (eNB) to the user equipment, wherein, the discovery signal resources include time-frequency domain resources used for sending or monitoring a discovery signal; and when the user equipment is required to perform a D2D discovery operation, sending or monitoring the discovery signal according to the acquired discovery signal resources to perform a D2D discovery.

It should be pointed that the discovery signal resources may also include code sequence resources used for sending or monitoring the discovery signal in certain scenarios.

Moreover, the discovery signal resources allocated by the eNodeB to the user equipment at least include one or more of the following:

different discovery signal resources allocated according to states of the user equipment, wherein, the user states include a connected state and an idle state;

different discovery signal resources allocated according to locations of the user equipment, wherein, the locations of the user equipment includes being at a cell edge and a cell center;

different discovery signal resources allocated according to application types of the user equipment; and different discovery signal resources allocated according to priorities of the user equipment.

Preferably, ways for the user equipment acquiring the discovery signal resources allocated by the eNodeB to the user equipment include the following kinds:

the user equipment receiving a discovery signal resource set broadcasted by the eNB;

receiving discovery signal resources allocated by the eNB to the present user equipment through a dedicated signaling;

receiving a discovery signal resource set broadcasted by the eNB, and after discovery signal resources are selected from the discovery signal resource set, the eNB performing coordination and confirmation;

receiving a discovery signal resource set sent by the eNB to the present user equipment through a dedicated signaling, and after the user equipment selects discovery signal resources from the discovery signal resource set, the eNB performing coordination and confirmation;

receiving a discovery signal resource set broadcasted by the eNB, the user equipment performing measurement with respect to discovery signal resources and making a report to the eNB, and the eNB selecting an appropriate discovery signal resource for the user equipment according to a measurement result of the user equipment; or receiving a discovery signal resource set sent by the eNB to the present user equipment through a dedicated signaling, the user equipment performing measurement with respect to discovery signal resources and making a report to the eNB, and the eNB selecting an appropriate discovery signal resource for the user equipment according to a measurement result of the user equipment; or receiving discovery signal resources allocated by the eNB to the present user equipment by means of combining a broadcast and a dedicated signaling.

Wherein, the process of the user equipment receiving the discovery signal resources allocated by the eNB to the present user equipment by means of combining a broadcast and a dedicated signaling can be implemented according to the following operations:

in a set condition, the user equipment receives a discovery signal resource set broadcasted by the eNB, and receives discovery signal resources allocated by the eNB to the present user equipment through a dedicated signaling. Or, the user equipment receives a discovery signal resource set broadcasted by the eNB, and receives a discovery signal resource sequence number indication allocated by the eNB to the present user equipment through a dedicated signaling, thus, the user equipment can obtain the discovery signal resources allocated to the present user equipment from the discovery signal resource set according to the received sequence number indication.

In addition, the discovery signal resources allocated by the eNodeB according to the states of the user equipment can include GROUP A resources and GROUP B resources. Wherein, the GROUP A resources are discovery signal resources allocated by the eNB to the user equipment in the connected state for use; and the GROUP B resources are discovery signal resources allocated by the eNB to the user equipment in the idle state for use. On this basis, the eNodeB also can dynamically adjust resources in a GROUP A resource pool and a GROUP B resource pool, including: adjusting the quantity of resources in respective resource pool of the GROUP A resource pool and the GROUP B resource pool, and adjusting the intercombination of time-frequency and/or code resources of the resources in the resource pools.

The implementation process of the above method will be introduced in detail in combination with specific application scenarios below.

Figure 2:
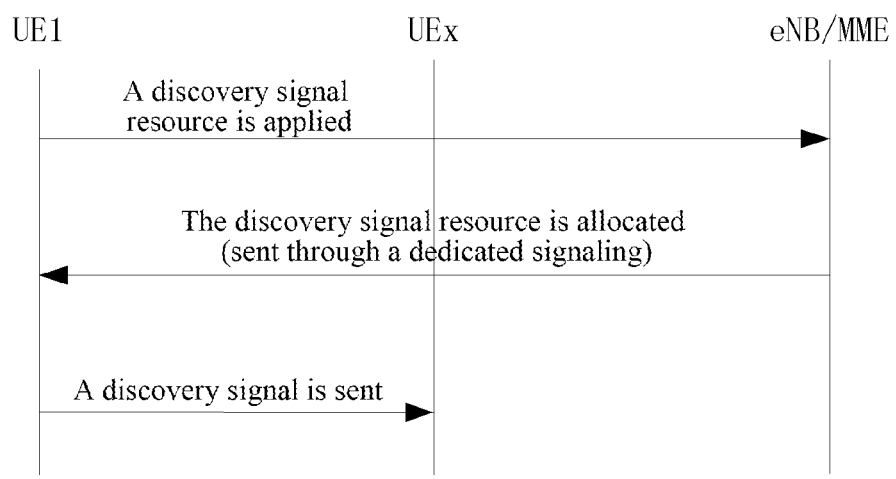
FIG. 2 is a schematic diagram of a process method 1 for an eNB allocating GROUP A resources to a user equipment in a connected state.

For example, the eNB allocates a GROUP A resource to a first user equipment in a connected state by means of dedicated signaling, at this point, a D2D discovery process is as shown in FIG. 2, and the following steps are included.

When it is required to use discovery signal resources, the first user equipment in the connected state sends information of applying for the discovery signal resources to the eNB.

After receiving the information of applying for the discovery signal resources from the first user equipment, the eNB selects one discovery signal resource from a GROUP A resource pool as a discovery signal resource allocated to the first user equipment, and sends the discovery signal resource to the first user equipment through a dedicated signaling.

Figure 3:
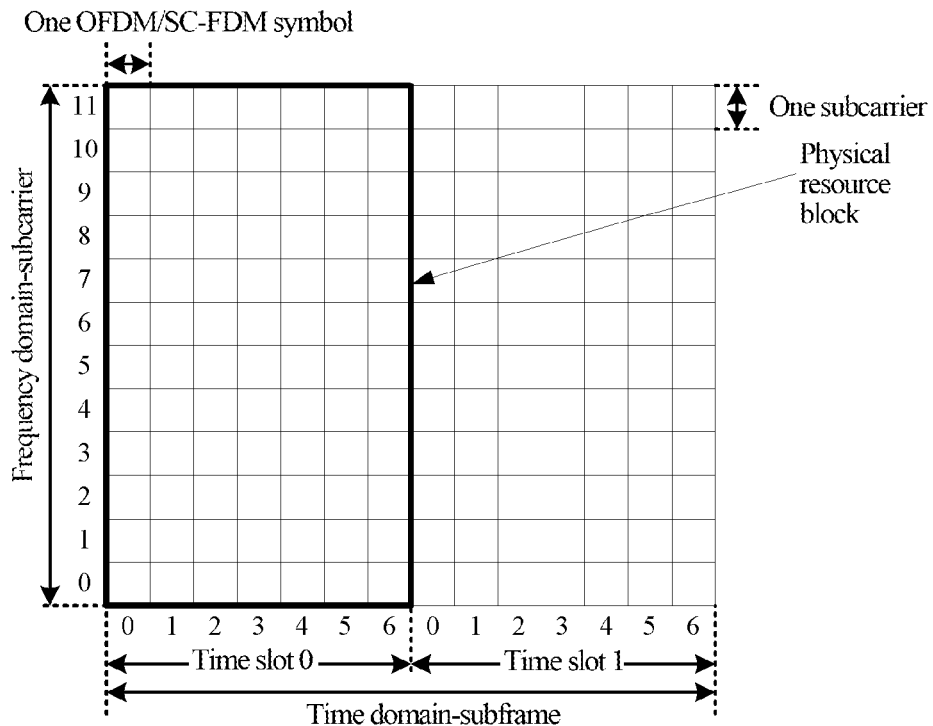
FIG. 3 is a schematic diagram of a structure of an LTE/LTE-A time-frequency domain.

The discovery signal resource includes usage information of aspects such as a time domain, a frequency domain and/or a discovery signal code sequence and so on. In the LTE/LTE-A system, radio communication resources are used in a bidimensional form of time domain and frequency domain (as shown in FIG. 3), and a signal used in the radio communication resources can be a code sequence. The discovery signal code sequence is generally a defined sequence conforming to usage requirements, the discovery signal code sequence can be a known sequence, such as a form of reused preamble sequence and pilot sequence and so on; and it can be a certain sequence newly defined according to the requirements of characteristics used by the D2D itself; or it is a form of extra field added in the known sequence and so on. Here, the time domain information and frequency domain information is resource information of the discovery signal required to be borne on corresponding time domain and frequency domain to be transmitted when the first user equipment sends the discovery signal in the D2D discovery process. The used time-frequency resources can be particular time-frequency resources used for the D2D discovery process, divided from uplink resources or downlink resources in cellular communication, and they can be shared between D2D discovery pairs in an orthogonal mode; or be shared with cellular communication in an orthogonal mode through uplink resources or downlink resources in the cellular communication; or be shared with cellular communication in a multiplexing mode through uplink resources or downlink resources in the cellular communication, and so on.

After receiving the discovery signal resource allocated by the eNB to the first user equipment, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

After the eNB receives the information of applying for the discovery signal resources from the first user equipment, the eNB can acquire type information of the first user equipment through related network elements of the network, such as location information of the user equipment, the application type of the user equipment and a priority of the user equipment and so on, so that the eNB can allocate a more reasonable discovery signal resource and/or usage pattern to the user equipment.

Besides allocating the discovery signal resources according to the states of the user equipment, the eNodeB also can allocate different GROUP A resources according to different locations of the user equipment in the connected state in the cell;

wherein, the eNB allocate a cell-edge GROUP A resource to the user equipment in the connected state located in a cell-edge area; and the eNB allocates a cell-center GROUP A resource to the user equipment in the connected state located in a cell-center area.

For example, the eNB allocates a discovery signal resource to the first user equipment in the connected state by means of the dedicated signaling according to the location information of the user equipment acquired through the related network elements of the network, and the following steps are specifically included.

When it is required to use the discovery signal resources, the first user equipment in the connected state sends information of applying for the discovery signal resources to the eNB.

After receiving the information of applying for the discovery signal resources from the first user equipment, the eNB acquires user equipment location information of the first user equipment through related network elements of the network.

Figure 4:
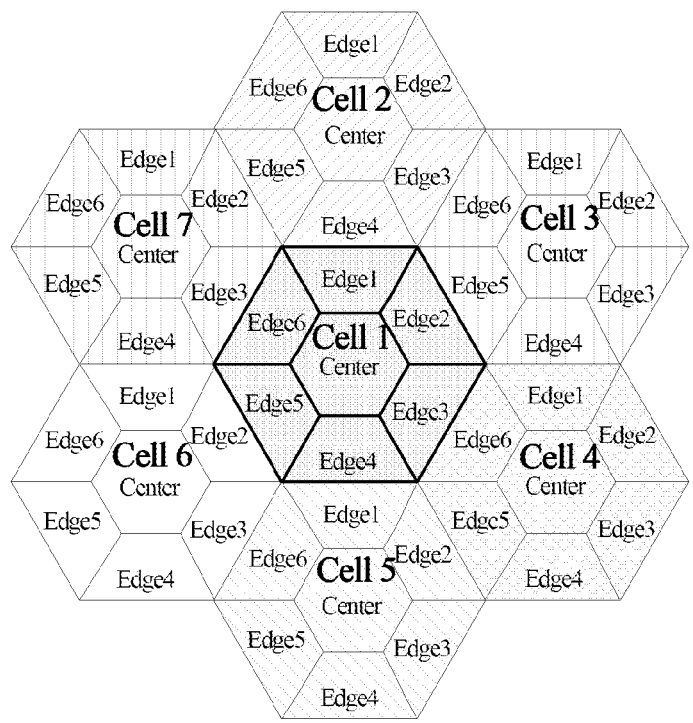
FIG. 4 is a schematic diagram of a relationship between a cell edge and a cell center.

According to the acquired location information of the first user equipment, the eNB allocates different types of discovery signal resources with respect to different cell areas in which the first user equipment is located: when the first user equipment is at a cell center, the eNB allocates GROUP A resources belonging to the cell center; if the first user equipment is at a cell edge, it judges a specific location of the cell edge in which the first user equipment is located, and allocates different cell-edge GROUP A resources according to the locations of the first user equipment, and as shown in FIG. 4, at different edges of the cell, the cell-edge GROUP A resources can be subdivided into a plurality of types of cell-edge GROUP A resources according to a relationship between the edges and neighboring cells. The eNB sends the allocated discovery signal resource to the first user equipment through a dedicated signaling.

After receiving the discovery signal resource allocated by the eNB to the first user equipment, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

The process of the eNodeB allocating a discovery signal resource according to the application type of the user equipment will be introduced below.

For example, the eNB allocates a discovery signal resource and a usage pattern to the first user equipment in the connected state by means of dedicated signaling according to the application type information of the user equipment acquired through the related network elements of the network. When the second user equipment searches and receives the discovery signal, the searched resource locations/ranges can be narrowed down according to the application type, thereby reducing the power consumption of the user equipment. The following steps are included.

When it is required to use discovery signal resources, the first user equipment in the connected state sends information of applying for the discovery signal resources to the eNB.

After receiving the information of applying for the discovery signal resources from the first user equipment, the eNB acquires the application type information of the first user equipment through related network elements of the network.

The eNB selects one discovery signal resource from a GROUP A resource pool as a discovery signal resource allocated to the first user equipment, and according to the acquired application type information of the first user equipment, it determines information including a service life of the discovery signal resource and a usage pattern of the discovery signal (such as a period of sending the discovery signal, a specific start location or a start and offset location and valid time of continuous sending; or related information of deducing the usage pattern of the discovery signal) and so on in the meantime, for example, the period of sending the discovery signal is to discover all neighboring user equipments around in the application type, the service life of the discovery signal resource can be set as a certain fixed time limit, such as a form of 120s and so on, or the service life of the discovery signal resource is set as continuous sending until the first user equipment asks for stop, for example, the discovery with respect to a certain user equipment is completed.

After determining the information, the eNB sends the information through a dedicated signaling to the first user equipment applying for the discovery signal resources.

After receiving the discovery signal resource allocated by the eNB to the first user equipment, according to the specified usage pattern of the discovery signal resource, the first user equipment periodically sends a discovery signal in the specified time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

Then, it is to introduce the process of the eNB sending a discovery signal resource set by broadcasting, the first user equipment in the connected state selecting a candidate discovery signal resource from the discovery signal resource set, and the eNB coordinating to confirm that the discovery signal resource can be used below.

Figure 5:
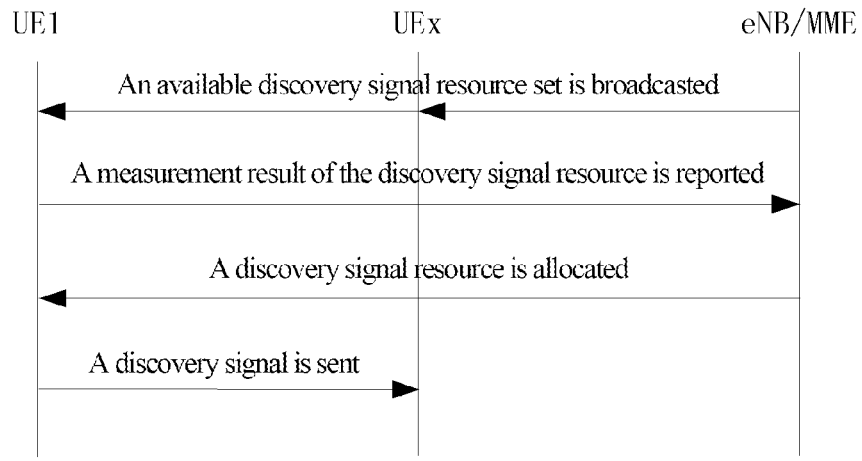
FIG. 5 is a schematic diagram of a process method 2 for an eNB allocating GROUP A resources to a user equipment in a connected state.

As shown in FIG. 5, it is an example of the process of the eNB sending a discovery signal resource set by means of broadcasting, the first user equipment in the connected state selecting a discovery signal resource from the discovery signal resource set, and the eNB coordinating to confirm that the selected discovery signal resource can be used, and the following steps are included.

The eNB broadcasts an available discovery signal resource set of GROUP A resources to a user equipment in a connected state in the cell under the eNB; different GROUP A resources can be broadcasted in different location areas of the cell, for example, with respect to a cell center, a discovery signal resource set of cell-center GROUP A resources is broadcasted to the user equipment in the connected state; and with respect to a cell edge, a discovery signal resource set of cell-edge GROUP A resources is broadcasted to the user equipment in the connected state; and as shown in FIG. 4, corresponding discovery signal resource sets of GROUP A resources of cell edges are broadcasted at different cell edges;

when it is required to use the discovery signal resources, the first user equipment in the connected state selects a candidate discovery signal resource from the received and broadcasted available discovery signal resource set of the GROUP A resources; for example, a discovery signal resource with weaker interference can be selected according to the condition of interference measurement on the discovery signal resource; it feeds back the selected candidate discovery signal resource to the eNB, and sends a feedback including a related measurement result to the eNB;

after the eNB receives the measurement result fed back by the first user equipment and the candidate discovery signal resource, the eNB performs coordination on the availability condition of the candidate discovery signal resource selected by the first user equipment to confirm that the discovery signal resource can be used; and after receiving an indication of an available discovery signal resource confirmed by the eNB, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

After the eNB receives the information of the candidate discovery signal resource selected by the first user equipment, the eNB can acquire the type information of the first user equipment through related network elements of the network, such as location information of the user equipment, the application type of the user equipment and the priority of the user equipment and so on, so that the eNB coordinates a reasonable discovery signal resource and/or usage pattern for the user equipment.

It is to introduce that, after receiving the discovery signal resources selected by the first user equipment, the eNB performing coordination and allocating a usage pattern of the discovery signal resources according to the application type information of the user equipment acquired through the related network elements of the network after below, and the following steps are included.

The eNB broadcasts an available discovery signal resource set of GROUP A resources to a user equipment in a connected state in the cell under the eNB;

when it is required to use the discovery signal resources, the first user equipment in the connected state selects a candidate discovery signal resource from the received and broadcasted available discovery signal resource set of the GROUP A resources; for example, a discovery signal resource with weaker interference can be selected according to the condition of interference measurement on the discovery signal resource; it feed backs the selected candidate discovery signal resource to the eNB, and sends a feedback including a related measurement result to the eNB;

after receiving the measurement result fed back by the first user equipment and the candidate discovery signal resource, the eNB coordinates to confirm an available candidate discovery signal resource; and acquires application type information of the first user equipment through related network elements of the network in the meantime, and the eNB confirms information including a service life of the discovery signal resource and a usage pattern of the discovery signal (such as a period of sending the discovery signal, a specific start location or a start and offset location and valid time of continuous sending; or related information of deducing the usage pattern of the discovery signal) and so on according to the application type information of the first user equipment, for example, the period of sending the discovery signal is to discover all neighboring user equipments around in the application type, the service life of the discovery signal resource can be set as a certain fixed time limit, such as a form of 120s and so on, or the service life of the discovery signal resource is set as continuous sending until the first user equipment asks for stop, for example, the discovery with respect to a certain user equipment is completed; and after receiving the indication of available discovery signal resources and the usage pattern fed back by the eNB, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

It is to introduce the process of the eNB sending a discovery signal resource set by broadcasting, and after receiving an application of using discovery signal resources from the first user equipment in the connected state, the eNB allocating a discovery signal resource sequence number to the first user equipment, and the first user equipment acquiring the discovery signal resources used by the first user equipment according to the received and broadcasted discovery signal resource set and the allocated discovery signal resource sequence number below.

Figure 6:
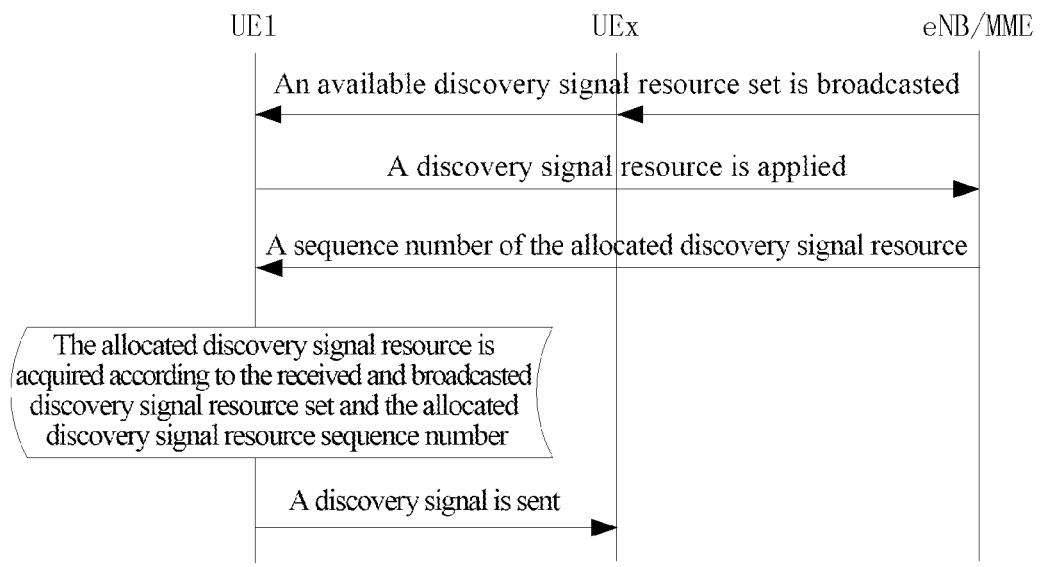
FIG. 6 is a schematic diagram of a process method 3 for an eNB allocating GROUP A resources to a user equipment in a connected state.

As shown in FIG. 6, it is an example of the process of the eNB sending the discovery signal resource set by broadcasting, and after receiving an application of using discovery signal resources from the first user equipment in the connected state, the eNB allocating a discovery signal resource to the first user equipment, and the following steps are included.

The eNB broadcasts an available discovery signal resource set of GROUP A resources to a user equipment in a connected state in the cell under the eNB;

when it is required to use the discovery signal resources, the first user equipment in the connected state sends an application of using discovery signal resources to the eNB; and after receiving the information of applying for the discovery signal resources from the first user equipment, the eNB selects one discovery signal resource from a GROUP A resource pool as a discovery signal resource allocated to the first user equipment, and informs the first user equipment of a corresponding discovery signal resource sequence number through a signaling.

After receiving the discovery signal resource sequence number allocated by the eNB to the first user equipment, according to the previously received discovery signal resource set broadcasted by the eNB, the first user equipment obtains the discovery signal resource allocated by the eNB, and thus it sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

After the eNB receives the information of applying for the discovery signal resources from the first user equipment, the eNB can acquire type information of the first user equipment through related network elements of the network, such as location information of the user equipment, the application type of the user equipment and a priority of the user equipment and so on, so that the eNB can allocate a more reasonable discovery signal resource and/or usage pattern to the user equipment, and the corresponding operations may refer to the above application scenarios.

Then, it is to introduce the process of the eNB sending a discovery signal resource set to a first user equipment in a connected state applying for discovery signal resources through a dedicated signaling, the first user equipment in the connected state selecting a candidate discovery signal resource from the discovery signal resource set, and the eNB confirming that the selected discovery signal resource can be used below.

Figure 7:
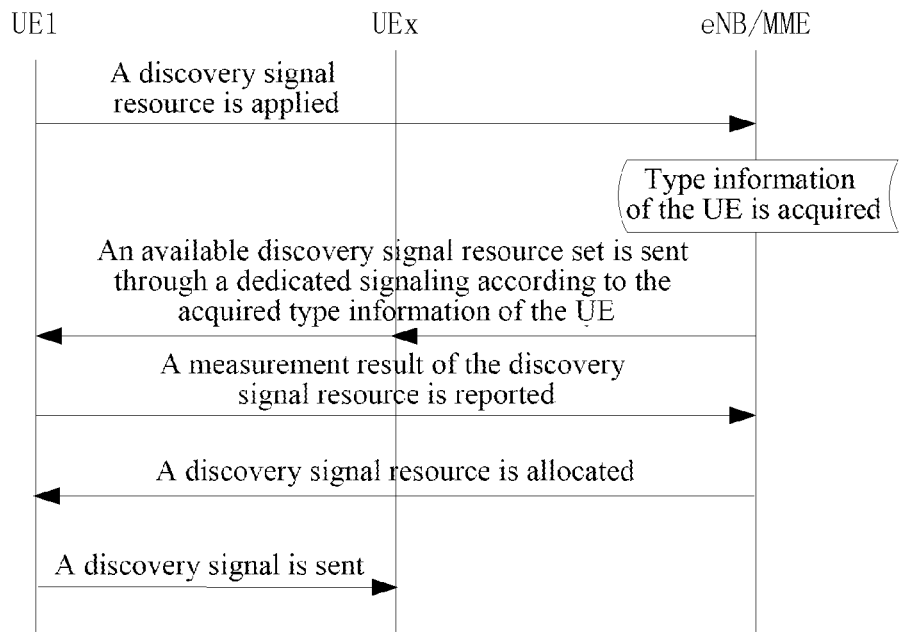
FIG. 7 is a schematic diagram of a process method 4 for an eNB allocating GROUP A resources to a user equipment in a connected state.

As shown in FIG. 7, it is an example of the process of the eNB sending a discovery signal resource set by means of dedicated signaling, the first user equipment in the connected state selecting a candidate discovery signal resource from the discovery signal resource set, and the eNB confirming that the selected discovery signal resource can be used, and the following steps are included.

When it is required to use discovery signal resources, the first user equipment in the connected state sends information of applying for the discovery signal resources to the eNB.

After receiving the information of applying for the discovery signal resources from the first user equipment, the eNB acquires the type information of the first user equipment through related network elements of the network, including location information of the first user equipment, an application type of the first user equipment and a priority of the first user equipment and so on.

According to the acquired location information of the first user equipment, the eNB sends an available discovery signal resource set of GROUP A resources belonging to an area in which the first user equipment is located to the first user equipment by means of dedicated signaling; after receiving the discovery signal resource set, according to the condition of interference measurement, the first user equipment selects a candidate discovery signal resource from the discovery signal resource set, and feeds back an executed interference measurement result and the candidate discovery signal resource to the eNB through a signaling in the meantime.

Meanwhile, according to the acquired information such as the application type of the first user equipment and so on, the eNB can determine information including a service life of the discovery signal resource and a usage pattern of the discovery signal (such as a period of sending the discovery signal, a specific start location or a start and offset location and valid time of continuous sending; or related information of deducing the usage pattern of the discovery signal) and so on, for example, the period of sending the discovery signal is to discover all neighboring user equipments around in the application type, the service life of the discovery signal resource can be set as a certain fixed time limit, such as a form of 120s and so on, or the service life of the discovery signal resource is set as continuous sending until the first user equipment asks for stop, for example, the discovery with respect to a certain user equipment is completed.

After the eNB receives the interference measurement result fed back by the first user equipment and the candidate discovery signal resource, the eNB performs coordination on the availability condition of the candidate discovery signal resource selected by the first user equipment to confirm that the discovery signal resource can be used; and it sends a usage pattern of the discovery signal resource to the first user equipment in the meantime.

After receiving the indication of available discovery signal resources and the usage pattern fed back by the eNB, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

Then, it is to introduce the process of the eNB sending a discovery signal resource set by broadcasting, the first user equipment in the connected state applying for the discovery signal resources performing the related measurement on the discovery signal resources and making a report to the eNB, and the eNB allocating discovery signal resources to the first user equipment according to a measurement result of the first user equipment below.

As shown in FIG. 5, it is an example of the process of the eNB sending a discovery signal resource set by broadcasting, the first user equipment in the connected state applying for the discovery signal resources performing related measurement on the discovery signal resources and making a report to the eNB, and the eNB allocating discovery signal resources to the first user equipment according to a measurement result of the first user equipment, and the following steps are included.

The eNB broadcasts an available discovery signal resource set of GROUP A resources to a user equipment in a connected state in the cell under the eNB;

when it is required to use discovery signal resources, the first user equipment in the connected state performs the related measurement on the received and broadcasted available discovery signal resources of the GROUP A resources, such as an interference measurement and so on; and after the measurement is completed, it applies to the eNB for discovery signal resources, and reports a measurement result; and after receiving the information of applying for the discovery signal resources from the first user equipment, the eNB acquires the type information of the first user equipment through related network elements of the network, including location information of the first user equipment, an application type of the first user equipment and a priority of the first user equipment and so on.

The eNB allocates a discovery signal resource to the first user equipment according to the measurement result and the current usage condition of discovery signal resources; and according to the acquired information such as the application type of the first user equipment and so on, it determines information including a service life of the discovery signal resource and a usage pattern of the discovery signal (such as a period of sending the discovery signal, a specific start location or a start and offset location and valid time of continuous sending; or related information of deducing the usage pattern of the discovery signal) and so on in the meantime, for example, the period of sending the discovery signal is to discover all neighboring user equipments around in the application type, the service life of the discovery signal resource can be set as a certain fixed time limit, such as a form of 120s and so on, or the service life of the discovery signal resource is set as continuous sending until the first user equipment asks for stop, for example, the discovery with respect to a certain user equipment is completed.

After receiving the discovery signal resource and the usage pattern allocated by the eNB, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

Then, it is to introduce the process of the eNB sending a discovery signal resource set to a first user equipment in a connected state applying for discovery signal resources through a dedicated signaling, the first user equipment in the connected state performing measurement on the discovery signal resources and making a report to the eNB, and the eNB allocating discovery signal resources to the first user equipment according to a measurement result of the first user equipment below.

As shown in FIG. 7, it is an example of the process of the eNB sending a discovery signal resource set by means of dedicated signaling, the first user equipment in the connected state performing measurement on the discovery signal resources and making a report to the eNB, and the eNB allocating discovery signal resources to the first user equipment according to a measurement result of the first user equipment, and the following steps are included.

When it is required to use discovery signal resources, the first user equipment in the connected state sends information of applying for the discovery signal resources to the eNB.

After receiving the information of applying for the discovery signal resources from the first user equipment, the eNB acquires the type information of the first user equipment through related network elements of the network, including location information of the first user equipment, an application type of the first user equipment and a priority of the first user equipment and so on.

According to the acquired location information of the first user equipment, the eNB sends an available discovery signal resource set of GROUP A resources belonging to an area in which the first user equipment is located to the first user equipment by means of dedicated signaling; after receiving the discovery signal resource set, the first user equipment performs the related measurement on the discovery signal resources, such as measurement in an interference aspect and so on, and it feeds back an executed interference measurement result to the eNB through a signaling.

Meanwhile, according to the acquired information such as the application type of the first user equipment and so on, the eNB can determine information including a service life of the discovery signal resource and a usage pattern of the discovery signal (such as a period of sending the discovery signal, a specific start location or a start and offset location and valid time of continuous sending; or related information of deducing the usage pattern of the discovery signal) and so on, for example, the period of sending the discovery signal is to discover all neighboring user equipments around in the application type, and the service life of the discovery signal resource can be set as a certain fixed time limit, such as a form of 120s and so on, or the service life of the discovery signal resource is set as continuous sending until the first user equipment asks for stop, for example, the discovery with respect to a certain user equipment is completed.

After receiving the measurement result fed back by the first user equipment, the eNB allocates a discovery signal resource to the first user equipment according to the measurement result and the current usage condition of discovery signal resources and so on; and it sends a usage pattern of the discovery signal resource to the first user equipment in the meantime.

After receiving the discovery signal resource and the usage pattern allocated by the eNB, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

It is to introduce a processing process of a first user equipment in a connected state moves to a different cell area in the process of sending a discovery signal below.

Figure 8:
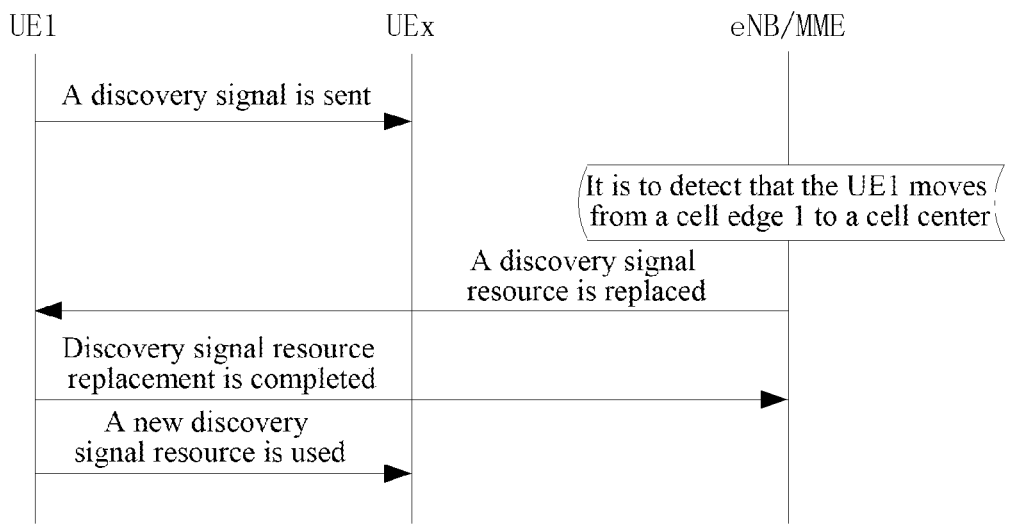
FIG. 8 is a schematic diagram of a process of replacing the used discovery signal resources when a user equipment in a connected state moves to a different cell location.

As shown in FIG. 8, it is an example of the processing process of the first user equipment in the connected state moves from a location of cell edge 1 to a cell center in the process of sending a discovery signal, and the following steps are included.

The eNB detects that the first user equipment in the connected state that is sending the discovery signal moves from the location of cell edge 1 to the cell center location with the positioning technology, and the eNB notifies the first user equipment to stop sending the discovery signal through a signaling, to release the used discovery signal resource, and to replace it with a discovery signal resource belonging to the new area location.

Then, the first user equipment and the eNB refer to the above implementation methods, the eNB completes reallocating a new discovery signal resource to the first user equipment, and the first user equipment feeds back a discovery signal resource replacement completion to the eNB, and uses a new discovery signal resource. Descriptions will be made with an example of the eNB allocating and replacing a GROUP A resource for the first user equipment by means of dedicated signaling below.

After receiving a message of replacing the discovery signal resource, the first user equipment stops sending a discovery signal, and releases the used discovery signal resource, and the eNB can allocate the discovery signal resource to other user equipments for use when required, and the corresponding process may refer to the embodiment 6;

the eNB selects a GROUP A resource belonging to the cell center as a discovery signal resource allocated to the first user equipment, and according to the application type of the first user equipment, it allocates information including a service life of the discovery signal resource and a usage pattern of the discovery signal (such as a period of sending the discovery signal, a specific start location or a start and offset location and valid time of continuous sending; or related information of deducing the usage pattern of the discovery signal) and so on in the meantime, and it sends the information to the first user equipment through a dedicated signaling;

after receiving the new discovery signal resource indication information and the usage pattern, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

Moreover, when the first user equipment in the connected state that is sending the discovery signal moves from other edge area locations of the cell to the center location of the cell, or moves from the center location of the cell to the edge area location of the cell, or moves from an edge area location of one cell to an edge area location of another cell, the replacement of the discovery signal resource shall be performed with reference to the above described process of the embodiment.

The process of the first user equipment in the connected state releasing the discovery signal resource will be introduced below.

The discovery signal resource allocated by the eNB and used by the first user equipment in the connected state has a service life, and after the service life expires, the first user equipment releases the used discovery signal resource in time, and the eNB can reallocate the discovery signal resource to user equipments for use; or, since the eNB replaces the discovery signal resource used by the first user equipment, or discovery signal resources are insufficient, or an interference problem exists in usage of the discovery signal resources, the first user equipment is required to release the used discovery signal resource; or, since the first user equipment in the connected state has completed the discovery process, or the discovery operation will not be performed any more before the usage of the discovery signal resource expires, the first user equipment is required to release the used discovery signal resource, and the eNB can allocate the discovery signal resource released by the first user equipment to other user equipments for use.

Figure 9:
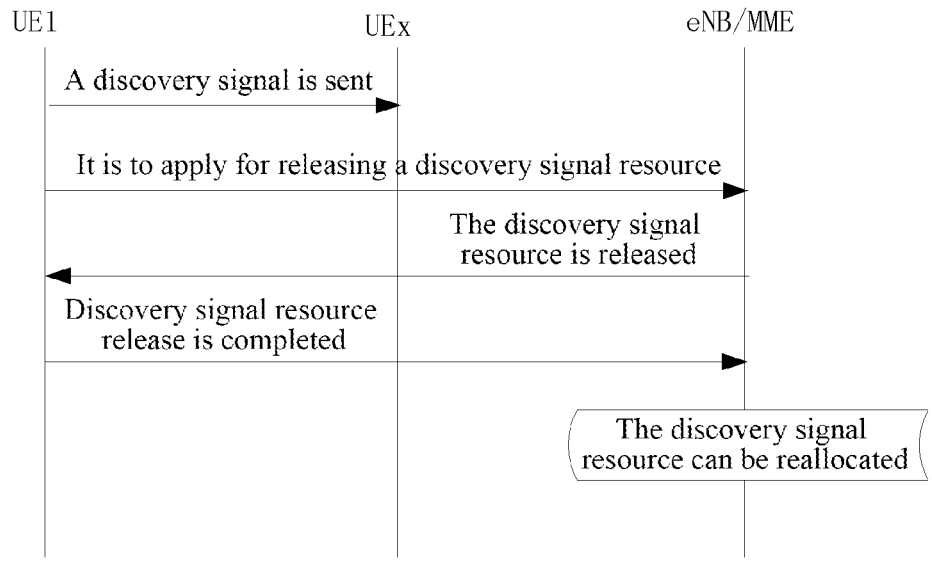
FIG. 9 is a flow chart of a user equipment in a connected state releasing discovery signal resources.

As shown in FIG. 9, it is an example of the process of the first user equipment in the connected state releasing the discovery signal resource, and the following steps are included.

the first user equipment requests to the eNB for releasing the discovery signal resource through a corresponding signaling;

the eNB sends a request acknowledgement of releasing the discovery signal resource to the first user equipment, and also requires the first user equipment to stop sending a discovery signal and release the discovery signal resource;

after receiving the signaling of stopping sending the discovery signal and releasing the discovery signal resource sent by the eNB, the first user equipment stops sending the discovery signal, and releases the used discovery signal resource; and it sends a signaling feedback that the discovery signal resource release has been completed to the eNB; and after receiving the signaling that the discovery signal resource release has been completed from the first user equipment, the eNB brings the discovery signal resource into a corresponding discovery signal resource pool, to be allocated to a user equipment applying for the discovery signal resource for use.

In particular, the process of the first user equipment releasing the discovery signal resource in other cases is similar to this, but only in certain cases the first user equipment is not required to apply for releasing the discovery signal resource, and the eNB directly demands the first user equipment to release the discovery signal resource.

Moreover, after the discovery signal resource used by the first user equipment is released, if the first user equipment still needs to use the discovery signal resource, the first user equipment is required to reapply to the eNB, and the eNB reallocates a discovery signal resource to the first user equipment.

The process of applying to the eNB for a renewal when the discovery signal resource used by the first user equipment in the connected state is about to expire will be introduced below.

Figure 10:
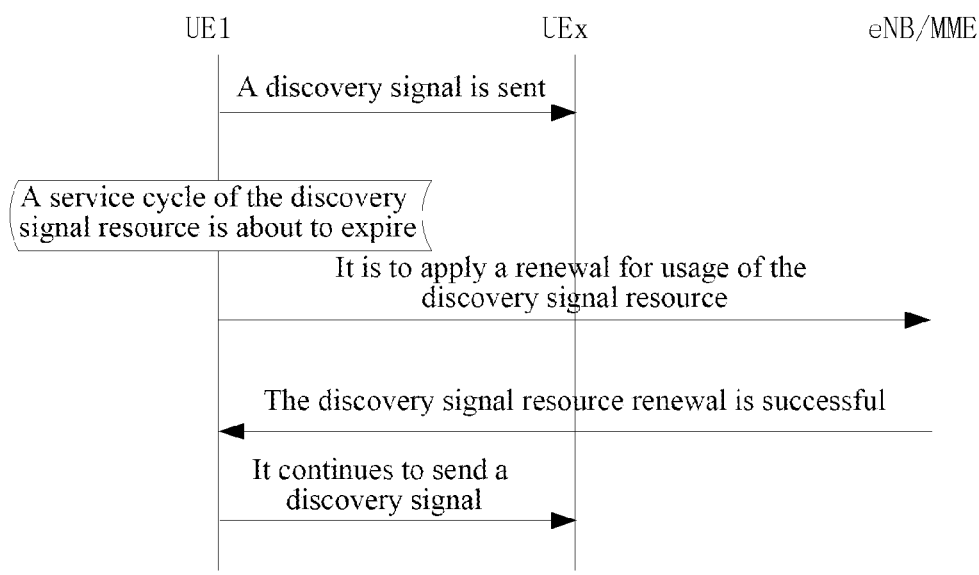
FIG. 10 is a flow chart of applying to the eNB for a renewal when the discovery signal resources used by the user equipment in the connected state are about to expire.

As shown in FIG. 10, it is an example of the process of applying to the eNB for a renewal when the discovery signal resource used by the first user equipment in the connected state is about to expire, and the following steps are included.

When a set timer of the service life of the discovery signal resource times out, the first user equipment in the connected state still needs to use the discovery signal resource, and it proposes a renewal application of using the discovery signal resource to the eNB;

after receiving the renewal application of the first user equipment, the eNB makes a comprehensive judgment according to information including the current usage condition of discovery signal resources of the area to which the first user equipment belongs and the type of the first user equipment and so on, and if it conforms to a renewal requirement, it sends a signaling feedback of agreeing the renewal application to the first user equipment applying for the renewal, including information such as a service life of the discovery signal resource and a usage pattern of the discovery signal and so on; and after receiving the signaling feedback of agreeing the renewal, the first user equipment resets the timer of the service life of the discovery signal resource according to the information of agreeing the renewal, and uses the discovery signal resource according to the usage pattern of the discovery signal resource allocated by the eNB.

If the eNB considers that the first user equipment does not conforms to the renewal requirement in the process of judging the renewal, a signaling of demanding the first user equipment to release the discovery signal resource is sent to the first user equipment, and the corresponding process refers to the embodiment 6; and if the eNB considers that it is required to replace the used discovery signal resource in the process of judging the renewal, the replacement of the discovery signal resource is completed with reference to the embodiment 5.

It is to introduce the process of a user equipment with a high priority applying for a discovery signal resource, and the eNB discovering there is no discovery signal resource that can be allocated, and the eNB compulsively demanding a user equipment with a low priority to release the discovery signal resource and allocating the discovery signal resource to the user equipment with the high priority below.

Figure 11:
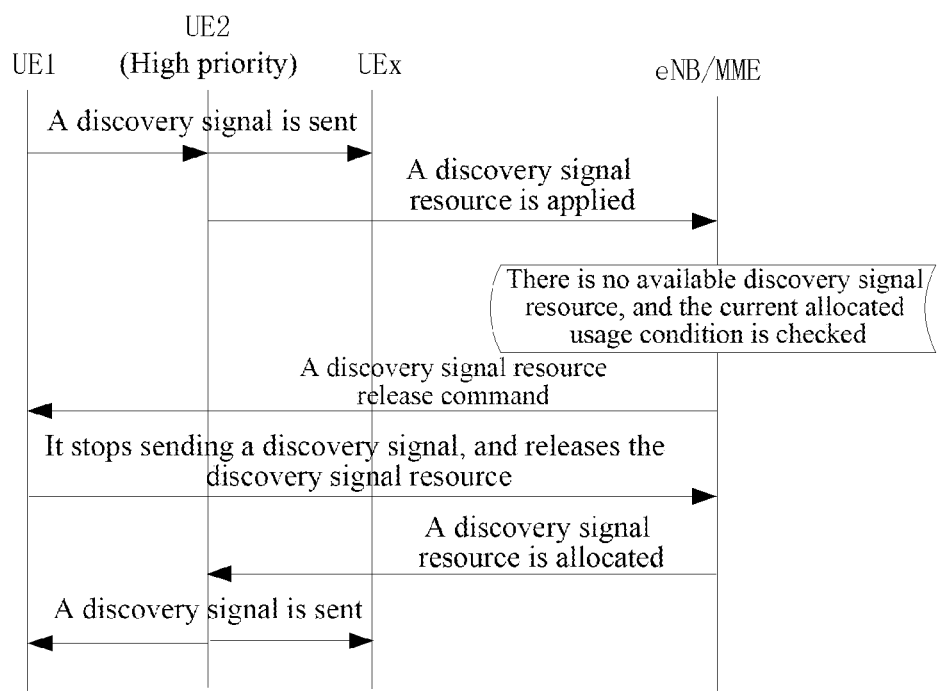
FIG. 11 is a flow chart of discovery signal resource allocation that the eNB forces a user equipment with a low priority to release discovery signal resources to a user equipment with a high priority.

As shown in FIG. 11, it is an example of the process of the eNB compulsively demanding a user equipment with a low priority to release the discovery signal resource and allocating the discovery signal resource to a user equipment with a high priority, and the following steps are included.

The user equipment with the high priority proposes an application for the discovery signal resource to the eNB in which the user equipment with the high priority is located;

after receiving the application of the user equipment with the high priority, the eNB discovers there is no discovery signal resource that can be allocated to the user equipment with the high priority, and thus the eNB checks the user equipments with a low priority that are located in the same cell area with the user equipment with the high priority and are using the discovery signal resource;

the eNB selects a discovery signal resource of one user equipment with the low priority from the user equipments, and sends a signaling of releasing the discovery signal resource to the user equipment with the low priority;

after receiving the signaling of releasing the discovery signal resource, with reference to the corresponding flow of the embodiment 6, the user equipment with the low priority stops sending a discovery signal, and releases the discovery signal resource; and it notifies a discovery signal resource release completion to the eNB; and after receiving a signaling of the user equipment with the low priority completing the discovery signal resource release, the eNB allocates the discovery signal resource to the user equipment with the high priority. The process of the eNB allocating the discovery signal resource to the user equipment with the high priority can be executed with reference to the above ways.

Figure 12:
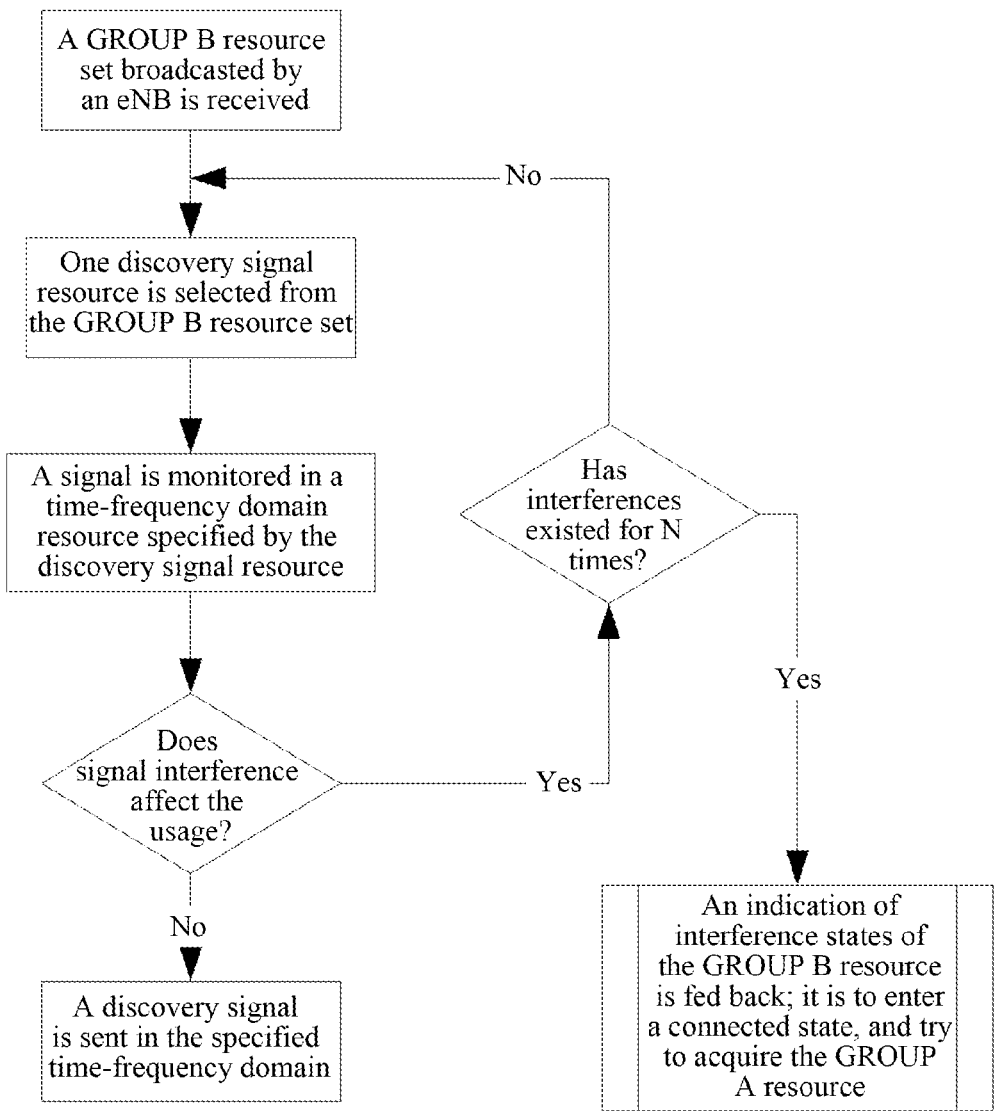
FIG. 12 is a process chart of a user equipment in an idle state acquiring and using GROUP B resources.

The process of a first user equipment in an idle state acquiring and using a GROUP B resource will be introduced below, the process is as shown in FIG. 12, and the followings steps are included.

The eNB broadcasts an available GROUP B resource set to the user equipment in the idle state in the cell under the eNB; the resource set includes a time-frequency resource used by the discovery signal resource, and/or a discovery signal code sequence, and a usage pattern of the discovery signal set by the eNB for various discovery signal resources (such as a period of sending the discovery signal, a specific start location or a start and offset location and valid time of continuous sending; or related information of deducing the usage pattern of the discovery signal).

The first user equipment in the idle state that needs to use the discovery signal resource selects one GROUP B resource from the received and broadcasted available GROUP B resource set;

the first user equipment monitors a received signal in the time-frequency domain resource specified by the selected discovery signal resource, to determine whether the usage of the resource has an interference, and to select a resource with a weaker interference for use; and if there is no signal interference on the resource or the interference is weaker, it indicates that the resource can be used; according to the specified usage pattern of the discovery signal and in accordance with the selected discovery signal resource, the first user equipment periodically sends a discovery signal in the specified time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

If a signal is received on the resource or the interference is stronger, it indicates that the selected resource cannot be used; the first user equipment should reselect another GROUP B resource form the received and broadcasted available GROUP B resource set, and then repeat the above step to perform the resource availability detection, to guarantee that the selected GROUP B resource can be used; and if it is to detect that the GROUP B resources selected for multiple times all have stronger interference and cannot be used, the first user equipment should initiate an RRC connection establishment and enter a connected state, the eNB allocates the discovery signal resource so as to perform the discovery process between the user equipments, and an indication of interference states of the GROUP B resource is fed back to the eNB in the meantime.

The GROUP B resource obtained by the first user equipment in the idle state can be continually used within the cell, and it will not be replaced when the first user equipment moves to different locations in the cell.

It is to introduce that the GROUP B resources can be divided into a plurality of groups to be used according to the situation of the user equipment testing the path loss, and a user equipment in an idle state is selected according to the testing of patch loss below, and the following steps are included.

The eNB broadcasts an available GROUP B resource set to the user equipment in the idle state in the cell under the eNB; the resource set includes a time-frequency resource used by the discovery signal resource, and/or a discovery signal code sequence, and a usage pattern of the discovery signal set by the eNB for various discovery signal resources (such as a period of sending the discovery signal, a specific start location or a start and offset location and valid time of continuous sending; or related information of deducing the usage pattern of the discovery signal).

The first user equipment in the idle state that needs to use the discovery signal resource tests the current path loss condition; and according to the current path loss condition, it selects a discovery signal resource from a corresponding group of the GROUP B resources;

the first user equipment monitors a received signal in the time-frequency domain resource specified by the selected discovery signal resource, to determine whether the usage of the resource has an interference, and to select a resource with a weaker interference for use; and according to the specified usage pattern of the discovery signal and in accordance with the selected discovery signal resource, the first user equipment periodically sends a discovery signal in the specified time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

If it is to detect that the GROUP B resources selected for multiple times all have stronger interference and cannot be used, the first user equipment should initiate an RRC connection establishment and enter a connected state, the eNB allocates the discovery signal resource so as to perform the discovery process between the user equipment, and an indication of interference states of the GROUP B resource is fed back to the eNB in the meantime.

The GROUP B resource obtained by the first user equipment in the idle state can be continually used within the cell, and it will not be replaced when the first user equipment moves to different locations in the cell.

The process of replacing the discovery signal resource after the first user equipment enters a connected state from an idle state will be introduced below.

Figure 13:
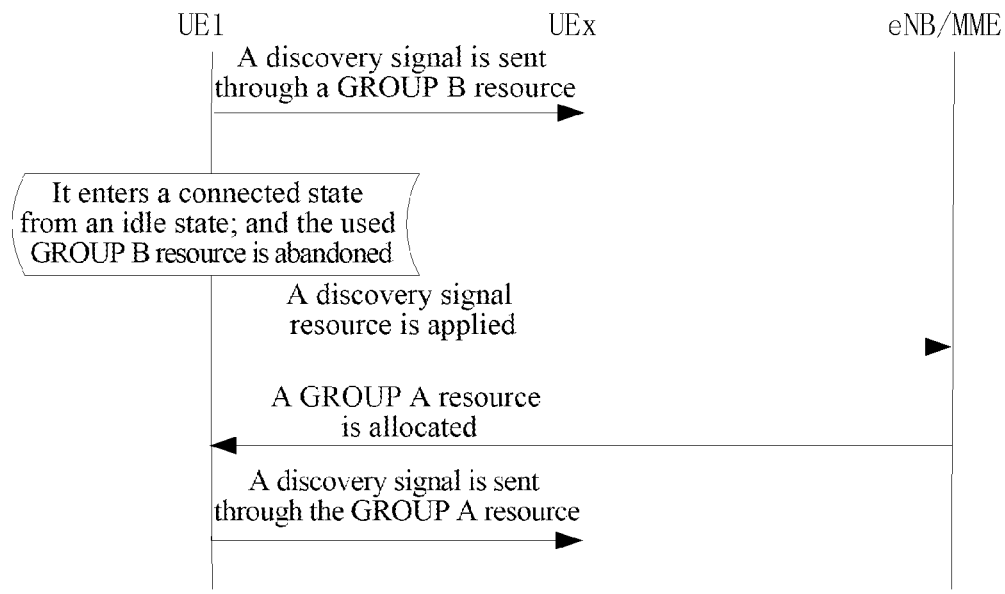
FIG. 13 is a process chart of replacing discovery signal resources after the user equipment enters a connected state from an idle state.
Figure 14:
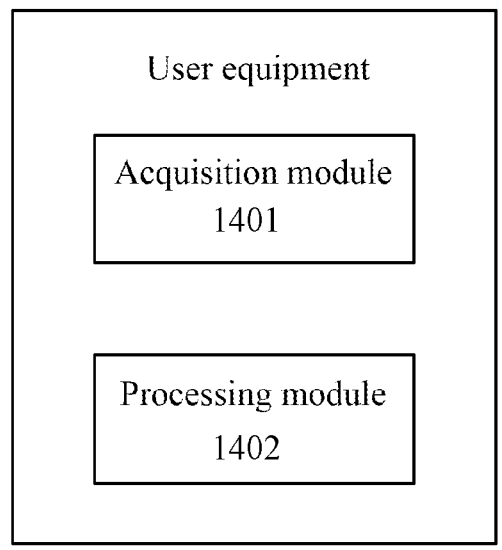
FIG. 14 is a schematic diagram of a user equipment according to the embodiment of the present invention.
Figure 15:
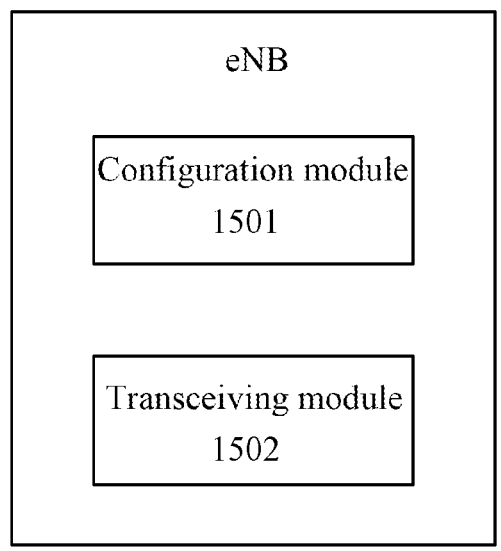
FIG. 15 is a schematic diagram of an eNodeB according to the embodiment of the present invention.

As shown in FIG. 13, it is an example of the process of replacing the discovery signal resource after the first user equipment enters a connected state from an idle state, and the followings steps are included.

The first user equipment enters the connected state from the idle state, stops sending a discovery signal, abandons the GROUP B resource that is being used; and it sends information of applying for the discovery signal resource to the eNB.

After receiving the information of applying for the discovery signal resource from the first user equipment, the eNB acquires type information of the first user equipment through related network elements of the network, including location information of the first user equipment, an application type of the first user equipment and a priority of the first user equipment and so on.

According to the acquired location information of the first user equipment, the eNB allocates a discovery signal resource of a location area in which the first user equipment is located; and according to the application type of the first user equipment, it allocates information including a service life of the signal resource and a usage pattern of the discovery signal (such as a period of sending the discovery signal, a specific start location or a start and offset location and valid time of continuous sending) and so on in the meantime, and the allocation method of the eNB and the acquisition way of the first user equipment may refer to the above process methods.

After receiving the indication of available discovery signal resources and the usage pattern fed back by the eNB, the first user equipment sends a discovery signal in corresponding time-frequency resources, and if the pattern of discovery signal code sequence is used, it sends a discovery signal code sequence in corresponding time-frequency resources; after receiving the discovery signal, according to a scheme of implementing the discovery process, if it is required to feed back the received discovery signal information to the eNB or the first user equipment, a second user equipment executes the process, to complete the discovery process between the user equipments.

The process of the eNB dynamically adjusting GROUP A resources and GROUP B resources will be introduced below. Descriptions will be made with an example of the eNB adjusting and reducing the quantity of GROUP A resources to satisfy the GROUP B resources below, and the followings steps are included.

The eNB discovers that a certain category of resource is less after the discovery signal resources are used, and it wishes to adjust the resource structure, for example, the usage of the GROUP A resources is less, and a large number of user equipments in the idle state needs to use the discovery signal resources (if more user equipments in the idle state feed back to the eNB that a conflict occurs when it is to acquire the discovery signal resources, it is required to turn into a connected state to acquire the discovery signal resources), and the eNB wishes to adjust part of GROUP A resources to GROUP B resources;

the eNB analyzes the usage condition of the GROUP A resources, including cell-center GROUP A resources and all cell-edge GROUP A resources; and it organizes the resources that can be adjusted, including the quantity of resources that can be adjusted in various categories of the GROUP A resource pools, and the adjustment condition of intercombination of time-frequency and/or code resources and so on; and the eNB adjusts the organized appropriate GROUP A resources to GROUP B resources, and brings the GROUP B resources into a GROUP B resource pool; in the adjustment process, it is required to reedit the following information (may be but not limited to): an identifier of the discovery signal resource (an identifier of GROUP A or an identifier of GROUP B), and a default usage pattern of the discovery signal and so on.

The eNB informs the user equipment in the idle state of a resource set of the GROUP B resource pool by broadcasting; and the user equipment in the idle state uses the resource of the GROUP B resource pool by means of competition, and the corresponding process is operated with reference to the embodiments 8 and 9.

In the usage process, adjusting the GROUP B resources to the GROUP A resources, or the adjustment within various categories of the GROUP A resources, and the adjustment of combination between the time-frequency and/or code resources within the discovery signal resources can be performed with reference to the above process, which will not be described here.

A negotiation of the GROUP B resource set between neighboring eNBs will be introduced below. Negotiating to allocate the same GROUP B resource set between neighboring eNBs can cause the received and broadcasted GROUP B resource sets to be the same and kept identical in the process of selecting the discovery signal resources when the user equipment in the idle state moves in different eNBs, which is beneficial to continuous development of the D2D discovery process between different eNBs.

The negotiation of the GROUP B resource set between the eNBs includes the following steps.

A first eNB sends a request of negotiating a GROUP B resource set between eNBs to a second eNB adjacent to the first eNB;

the second eNB performs feedback of agreeing the negotiation of the GROUP B resource set between eNBs to the first eNB;

the first eNB sends information of the GROUP B resource set to the second eNB adjacent to the first eNB, including the quantity of GROUP B resources, a time-frequency resource of the GROUP B resource, and/or a discovery signal code sequence, and a usage pattern of the discovery signal set by the eNB for various discovery signal resources (such as a period of sending the discovery signal, a specific start location or a start and offset location and valid time of continuous sending) and so on;

after receiving the information of the GROUP B resource set sent by the first eNB, in combination with the condition of the GROUP B resource set of the second eNB, the second eNB determines to adjust its own GROUP B resource set or demands the first eNB to perform adjustment of the GROUP B resource set;

if the second eNB determines to adjust its own GROUP B resource set, the adjustment of the GROUP B resource set is performed with reference to the embodiment 11, and after the adjustment is completed, it is to feed back to the first eNB that the GROUP B resource sets have been kept identical;

if the first eNB is required to perform the adjustment of the GROUP B resource set, the second eNB sends its own GROUP B resource set information to the first eNB, and demands the first eNB to perform the adjustment of the GROUP B resource set; the first eNB performs the adjustment of the GROUP B resource set according to the feedback information of the second eNB, or continues to negotiate with the second eNB to perform the adjustment of the GROUP B resource set, so as to guarantee that the GROUP B resource sets between the eNBs are the same.

The same GROUP B resources are allocated between neighboring eNBs, or it also can guarantee that the GROUP B resource pool of the neighboring eNB has the same GROUP B resources in a uniform way when the network management system configures resources of the GROUP A resource pool and GROUP B resource pool of the eNB. Or it also can guarantee the GROUP B resource pool of the neighboring eNB has the same GROUP B resources by means of combining negotiations between the network management system and the eNB.

Embodiment 2

The embodiment introduces a user equipment, which at least includes an acquisition module 1401 and a processing module 1402.

The acquisition module 1401 is configured to: acquire discovery signal resources allocated by an eNodeB (eNB) to the user equipment, wherein the discovery signal resources include time-frequency domain resources used for sending or monitoring a discovery signal; and In certain scenarios, the above discovery signal resources also include code sequence resources used for sending or monitoring a discovery signal.

Preferably, the acquisition module 1401 is configured to acquire the discovery signal resources allocated by the eNodeB to the user equipment by means of:

receiving a discovery signal resource set broadcasted by the eNB;

receiving discovery signal resources allocated by the eNB to the present user equipment through a dedicated signaling;

receiving a discovery signal resource set broadcasted by the eNB, and after discovery signal resources are selected from the discovery signal resource set, the eNB performing coordination and confirmation;

receiving a discovery signal resource set sent by the eNB to the present user equipment through a dedicated signaling, and after discovery signal resources are selected from the discovery signal resource set, the eNB performing coordination and confirmation;

receiving a discovery signal resource set broadcasted by the eNB, the user equipment performing measurement with respect to discovery signal resources and making a report to the eNB, and the eNB selecting an appropriate discovery signal resource for the user equipment according to a measurement result of the user equipment;

receiving a discovery signal resource set sent by the eNB to the present user equipment through a dedicated signaling, the user equipment performing measurement with respect to discovery signal resources and making a report to the eNB, and the eNB selecting an appropriate discovery signal resource for the user equipment according to a measurement result of the user equipment;

receiving discovery signal resources allocated by the eNB to the present user equipment by means of combining a broadcast and a dedicated signaling.

The processing module 1402 is configured to: when the present user equipment is required to perform a D2D discovery operation, send or monitor the discovery signal according to the discovery signal resources acquired by the acquisition module to perform a D2D discovery.

Moreover, the processing module is further configured to: send a resource request to the eNodeB to request the eNodeB for allocating discovery signal resources to the present user equipment, wherein the resource request includes the capability of the user equipment and the type of the user equipment.

Besides the above operations, the user equipment provided in the embodiment can implement the D2D discovery method provided in the above embodiment 1, thus other operations of the eNodeB may refer to the related contents in the embodiment 1, which will not be repeated here.

Embodiment 3

The embodiment introduces an eNodeB, which at least includes the following modules.

a configuration module 1501 is configured to: allocate discovery signal resources to a user equipment, wherein the discovery signal resources include time-frequency domain resources used for sending a discovery signal;

in certain schemes, the above discovery signal resources also include code sequence resources used for sending a discovery signal.

A transceiving module 1502 is configured to: notify the user equipment of the discovery signal resources allocated to the user equipment.

Preferably, the transceiving module 1502 is configured to send a discovery signal resource set by broadcasting; or allocate discovery signal resources to the user equipment through a dedicated signaling; or send a discovery signal resource set by broadcasting, and after the user equipment makes a selection, perform coordination and confirmation; or send a discovery signal resource set to the user equipment through a dedicated signaling, and after the user equipment selects discovery signal resources from the discovery signal resource set, perform coordination and confirmation; or send a discovery signal resource set by broadcasting, and after the user equipment performs measurement with respect to discovery signal resources and makes a report after receiving the discovery signal resource set, select an appropriate discovery signal resource for the user equipment according to a measurement result of the user equipment; or send a discovery signal resource set to the user equipment through a dedicated signaling, and after the user equipment performs measurement with respect to discovery signal resources and makes a report after receiving the discovery signal resource set, select an appropriate discovery signal resource for the user equipment according to a measurement result of the user equipment; or allocate discovery signal resources to the user equipment by means of combining a broadcast and a dedicated signaling.

Wherein, the corresponding process of allocating the discovery signal resources to the user equipment by means of combining a broadcast and a dedicated signaling may refer to the following.

The transceiving module 1502 broadcasts a discovery signal resource set, and in a set condition, it allocates discovery signal resources to the user equipment through a dedicated signaling. Or, the transceiving module broadcasts a discovery signal resource set, and allocates a discovery signal resource sequence number indication to the user equipment through a dedicated signaling, so as to instruct the user equipment to obtain discovery signal resources allocated to the present user equipment from the discovery signal resource set according to a sequence number.

The discovery signal resources allocated by the above configuration module 1501 to the user equipment at least include one or more of the following:

different discovery signal resources allocated according to states of the user equipment;

different discovery signal resources allocated according to locations of the user equipment;

different discovery signal resources allocated according to application types of the user equipment; and different discovery signal resources allocated according to priorities of the user equipment.

Moreover, the configuration module 1501 is configured to allocate discovery signal resources to the user equipment in different states, including: GROUP A resources and GROUP B resources, wherein, the GROUP A resources are discovery signal resources allocated by the eNB to a user equipment in a connected state for use; and the GROUP B resources are discovery signal resources allocated by the eNB to a user equipment in an idle state for use. On this basis, the configuration module 1501 is further configured to dynamically adjust resources in a GROUP A resource pool and a GROUP B resource pool, including: adjusting the quantity of resources in respective resource pool of the GROUP A resource pool and the GROUP B resource pool, and adjusting the intercombination of time-frequency and/or code resources of the resources in the resource pools.

Wherein, the configuration module 1501 is configured to: according to different locations of the user equipment in the connected state in the cell, allocate different GROUP A resources. For example, the eNB allocates a cell-edge GROUP A resource to a user equipment in a connected state located in a cell-edge area; and allocates a cell-center GROUP A resource to a user equipment in a connected state located in a cell-center area. At this point, the corresponding operations may refer to the corresponding contents in the embodiment 1, which will not be repeated here.

It should be noted that the configuration module 1501 is configured to allocate a cell-edge GROUP A resource different from a cell-edge GROUP A resource in an edge area of a neighboring cell of the cell to the user equipment in the connected state located in the cell-edge area.

The configuration module 1501 is configured to: when a user equipment in a connected state moves to a different cell area, reallocate GROUP A resources belonging to the cell area to the user equipment in the connected state.

Similarly, the configuration module1 501 is further configured to dynamically adjust resources of various cell-edge GROUP A resource pools and cell-center GROUP A resource pools in the GROUP A resources, including: adjusting the quantity of resources in various cell-edge GROUP A resource pools and cell-center GROUP A resource pools, and adjusting the intercombination of time-frequency and/or code resources of the resources in the resource pools.

In a preferred scheme, the configuration module 1501 is configured to: when allocating the GROUP A resources, firstly allocate discovery signal resources to a user equipment in a connected state with a high priority. Moreover, the configuration module 1501 is configured to allocate GROUP A resources used by a user equipment in a connected state with a low priority to the user equipment in the connected state with the high priority.

The configuration module 1501 is further configured to: when allocating the GROUP A resources, allocate a service life of the discovery signal resources and a usage pattern of the discovery signal according to the application types of the user equipment;

wherein, the service life of the discovery signal resources is a duration that the GROUP A resources can be used by the user equipment;

the usage pattern of the discovery signal includes a period of sending the discovery signal, a specific start location or a start and offset location and valid time of continuous sending; or the usage pattern of the discovery signal includes related information of deducing the usage pattern of the discovery signal.

Besides the above operations, the user equipment may end the usage of the GROUP A resources in advance, at this point, the configuration module 1501 is configured to: when the user equipment sends an indication that a service life of the used GROUP A resources expires, instruct the user equipment to release the used GROUP A resources, and allocate the GROUP A resources to other user equipments;

or, when the user equipment proposes a renewal application to the present eNodeB, perform processing on the renewal application;

the processing performed by the configuration module 1501 on the renewal application includes agreeing a renewal, replacing resources and releasing resources.

In consideration of reasonable resource utilization, certain schemes propose that the transceiving module 1502 is further configured to instruct a plurality of user equipments to release the used GROUP A resources in any one of the following cases:

a location area in which the user equipment is located is changed, discovery signal resources are insufficient, and an interference problem exists in usage of the discovery signal resources.

Certainly, the transceiving module 1502 is further configured to receive a message request of releasing the GROUP A resources in advance sent by the user equipment. Therefore, after the present eNodeB receives the above message request, the configuration module can allocate the GROUP A resources to other user equipments.

And with respect to the GROUP B resources mentioned above, the configuration module 1501 is further configured to allocate a resource set of the GROUP B resource pool to the user equipment in the idle state. At this point, the transceiving module 1502 is configured to send GROUP B resource set information to a user equipment in an idle state belonging to a cell under the eNodeB by broadcasting.

It should be noted that the configuration module can preset a usage pattern of the discovery signal in the GROUP B resources;

the usage pattern of the discovery signal includes a period of sending the discovery signal, a specific start location or a start and offset location and valid time of continuous sending; or the usage pattern of the discovery signal includes related information of deducing the usage pattern of the discovery signal.

Moreover, in certain scenarios, the transceiving module 1502 is further configured to: receive a resource request sent by the user equipment and/or other eNBs, wherein the resource request includes the capability of the user equipment and the type of the user equipment. At this point, the configuration module 1501 is configured to: after receiving the above resource request, allocate discovery signal resources to the user equipment.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The patent document is not limited to any combination of hardware and software in a specific form.

The above description is only the preferred embodiments of the present invention, which is not used to limit the protection scope of the patent document. All the modifications, equivalent substitutions, and improvements, etc. made within the spirit and principle of the patent document shall fall into the protection scope of the patent document.

INDUSTRIAL APPLICABILITY

With the scheme of using the discovery signal resources in the D2D discovery process provided in the technical scheme of the embodiment, it not only can be flexibly applied to various scenarios of the D2D discovery, but also can reduce the conflict of resource usage, thereby improving a reliability of the D2D discovery. Moreover, with the method of using the discovery signal resources in the D2D discovery process provided in the embodiment, it also can be convenient for the eNB to uniformly manage the discovery signal resources.

What is claimed is:

1. A device-to-device D2D discovery method, comprising:
   a user equipment acquiring discovery signal resources allocated by an eNB to the user equipment, wherein the discovery signal resources comprise time-frequency domain resources used for sending or monitoring a discovery signal, and/or code sequence resources used for sending or monitoring the discovery signal; and
   when the user equipment performs a D2D discovery operation, sending or monitoring the discovery signal according to acquired discovery signal resources to perform a D2D discovery;
   wherein the discovery signal resources allocated by the eNB to the user equipment at least comprise:
   different discovery signal resources allocated according to states of the user equipment.

2. The method according to claim 1, wherein the discovery signal resources allocated by the eNB to the user equipment further comprise one or more of the following:
   different discovery signal resources allocated according to locations of the user equipment;
   different discovery signal resources allocated according to application types of the user equipment; and
   different discovery signal resources allocated according to priorities of the user equipment.

3. The method according to claim 2, wherein, the user equipment acquiring the discovery signal resources allocated by the eNB to the user equipment comprises:
   the user equipment receiving a discovery signal resource set broadcasted by the eNB; or
   receiving discovery signal resources allocated by the eNB to the present user equipment through a dedicated signaling; or
   receiving a discovery signal resource set broadcasted by the eNB, and after discovery signal resources are selected from the discovery signal resource set, the eNB performing coordination and confirmation; or
   receiving a discovery signal resource set sent by the eNB to the present user equipment through a dedicated signaling, and after the user equipment selects discovery signal resources from the discovery signal resource set, the eNB performing coordination and confirmation; or
   receiving a discovery signal resource set broadcasted by the eNB, the user equipment performing measurement with respect to discovery signal resources and making a report to the eNB, and the eNB selecting an appropriate discovery signal resource for the user equipment according to a measurement result of the user equipment; or
   receiving a discovery signal resource set sent by the eNB to the present user equipment through a dedicated signaling, the user equipment performing measurement with respect to discovery signal resources and making a report to the eNB, and the eNB selecting an appropriate discovery signal resource for the user equipment according to a measurement result of the user equipment; or
   receiving discovery signal resources allocated by the eNB to the present user equipment by means of combining a broadcast and a dedicated signaling.

4. The method according to claim 3, wherein, the user equipment receiving the discovery signal resources allocated by the eNB to the present user equipment by means of combining a broadcast and a dedicated signaling comprises:
   in a set condition, the user equipment receiving a discovery signal resource set broadcasted by the eNB, and receiving discovery signal resources allocated by the eNB to the present user equipment through a dedicated signaling; or
   the user equipment receiving a discovery signal resource set broadcasted by the eNB, and receiving a discovery signal resource sequence number indication allocated by the eNB to the present user equipment through a dedicated signaling, and the user equipment obtaining discovery signal resources allocated to the present user equipment from the discovery signal resource set according to a received sequence number indication.

5. The method according to claim 4, wherein the states of the user equipment comprise a connected state and an idle state.

6. The method according to claim 3, further comprising:
   the user equipment and/or other eNBs sending a resource request, wherein the resource request comprises the capability of the user equipment and the type of the user equipment; and
   after receiving the resource request, the eNB allocating discovery signal resources to the user equipment.

7. The method according to claim 6, wherein the states of the user equipment comprise a connected state and an idle state.

8. The method according to claim 3, wherein the states of the user equipment comprise a connected state and an idle state.

9. The method according to claim 2, wherein the states of the user equipment comprise a connected state and an idle state.

10. The method according to claim 9, wherein,
    the discovery signal resources allocated by the eNB according to the states of the user equipment comprise: GROUP A resources and GROUP B resources, wherein,
    the GROUP A resources are discovery signal resources allocated by the eNB to a user equipment in a connected state for use; and
    the GROUP B resources are discovery signal resources allocated by the eNB to a user equipment in an idle state for use,
    wherein the eNB dynamically adjusts resources in a GROUP A resource pool and a GROUP B resource pool, comprising: adjusting the quantity of resources in respective resource pool of the GROUP A resource pool and the GROUP B resource pool, and adjusting the intercombination of time-frequency and/or code resources of resources in resource pools.

11. The method according to claim 10, wherein,
when allocating the GROUP A resources, the eNB firstly allocates discovery signal resources to a user equipment in a connected state with a high priority;
the eNB allocates GROUP A resources used by a user equipment in a connected state with a low priority to the user equipment in the connected state with the high priority;
when allocating the GROUP A resources, the eNB allocates a service life of the discovery signal resources and a usage pattern of the discovery signal according to application types of the user equipment;
wherein, the service life of the discovery signal resources is a duration that the GROUP A resources can be used by the user equipment;
the usage pattern of the discovery signal comprises a period of sending the discovery signal, a specific start location or a start and offset location and valid time of continuous sending; or
the usage pattern of the discovery signal comprises related information of deducing the usage pattern of the discovery signal;
after a service life of GROUP A resources used by the user equipment expires, the eNB instructs the user equipment to release the used GROUP A resources, and allocates the GROUP A resources to other user equipments;
or, when the service life of the used GROUP A resources expires and the GROUP A resources are still required to be used, the user equipment proposes a renewal application to the eNB, and the eNB performs processing on the renewal application;
the processing performed by the eNB on the renewal application comprises agreeing a renewal, replacing resources and releasing resources;
after the GROUP A resources used by the user equipment are released, if there is still a need to use the discovery signal, the user equipment need to reapply to the eNB;
the eNB instructs the user equipment to release the used GROUP A resources in any one of following cases:
a location area in which the user equipment is located is changed, discovery signal resources are insufficient, and an interference problem exists in usage of the discovery signal resources;
before a service life of GROUP A resources allocated to the user equipment expires, the user equipment sends a message to request for releasing the GROUP A resources in advance, and the eNB allocates the GROUP A resources to other user equipments after receiving the message.

12. The method according to claim 10, wherein,
the eNB allocates a resource set of GROUP B resource pool to the user equipment in the idle state;
the eNB sends GROUP B resource set information to a user equipment in an idle state belonging to a cell under the eNB by broadcasting;
the user equipment in the idle state receives a GROUP B resource set; and
the user equipment in the idle state selects discovery signal resources from the GROUP B resource set to send discovery information;
the user equipment in the idle state monitors discovery signal resources corresponding to the GROUP B resource set, and selects a resource with a weak interference;
GROUP B resources selected by the user equipment in the idle state are continually used within a cell;
the eNB presets a usage pattern of the discovery signal in the GROUP B resources;
the usage pattern of the discovery signal comprises a period of sending the discovery signal, a specific start location or a start and offset location and valid time of continuous sending; or
the usage pattern of the discovery signal comprises related information of deducing the usage pattern of the discovery signal;
when using the GROUP B resources, if an interference to other resources and/or other signals is discovered to be stronger, the user equipment reselects an appropriate GROUP B resource from a GROUP B resource pool; and if interferences of the GROUP B resources selected for multiple times are all stronger, the user equipment can initiate a radio resource control (RRC) connection establishment, entering a connected state, applying to the eNB for allocating GROUP A resources to perform a D2D discovery operation, and the user equipment performs feedback of an indication of interference states of the GROUP B resources to the eNB in the meantime;
a network management system uniformly configures identical GROUP B resource sets and/or different eNBs can coordinately allocate identical GROUP B resource sets.

13. The method according to claim 2, wherein,
the locations of the user equipment are that the user equipment is located at a cell edge or a cell center.

14. The method according to claim 13, wherein,
according to different locations of the user equipment in a connected state in a cell, the eNB allocates different GROUP A resources;
wherein, the eNB allocates a cell-edge GROUP A resource to a user equipment in a connected state located in a cell-edge area; and
the eNB allocates a cell-center GROUP A resource to a user equipment in a connected state located in a cell-center area;
the eNB allocates a cell-edge GROUP A resource different from a cell-edge GROUP A resource in an edge area of a neighboring cell of a cell to the user equipment in the connected state located in the cell-edge area;
when a user equipment in a connected state moves to a different cell area, the eNB reallocates GROUP A resources belonging to the cell area to the user equipment in the connected state;
the eNB dynamically adjusts resources of various cell-edge GROUP A resource pools and cell-center GROUP A resource pools in the GROUP A resources, comprising: adjusting the quantity of resources in various cell-edge GROUP A resource pools and cell-center GROUP A resource pools, and adjusting the intercombination of time-frequency and/or code resources of resources in resource pools.

15. A user equipment, comprising:
a non-transitory computer readable storage medium;
a processor coupled to the non-transitory computer readable storage medium, executing:
an acquisition module to acquire discovery signal resources allocated by an eNB to the user equipment, wherein the discovery signal resources comprise time-frequency domain resources used for sending or monitoring a discovery signal, and/or code sequence resources used for sending or monitoring a discovery signal; and a processing module to, when the present user equipment is required to perform a device-to-device (D2D) discovery operation, send or monitor the discovery signal according to the discovery signal resources acquired by the acquisition module to perform a D2D discovery;

the acquisition module acquires the discovery signal resources allocated by the eNB to the user equipment by means of:

receiving a discovery signal resource set broadcasted by the eNB; or receiving discovery signal resources allocated by the eNB to the present user equipment through a dedicated signaling; or receiving a discovery signal resource set broadcasted by the eNB, and after discovery signal resources are selected from the discovery signal resource set, the eNB performing coordination and confirmation; or receiving a discovery signal resource set sent by the eNB to the present user equipment through a dedicated signaling, and after discovery signal resources are selected from the discovery signal resource set, the eNB performing coordination and confirmation; or receiving a discovery signal resource set broadcasted by the eNB, performing measurement with respect to discovery signal resources and making a report to the eNB, and the eNB selecting an appropriate discovery signal resource for the user equipment according to a measurement result of the acquisition module; or receiving a discovery signal resource set sent by the eNB to the present user equipment through a dedicated signaling, performing measurement with respect to discovery signal resources and making a report to the eNB, and the eNB selecting an appropriate discovery signal resource for the user equipment according to a measurement result of the acquisition module; or receiving discovery signal resources allocated by the eNB to the present user equipment by means of combining a broadcast and a dedicated signaling;

the processing module is further configured to: send a resource request to the eNB to request the eNB for allocating discovery signal resources to the present user equipment, wherein the resource request comprises the capability of the user equipment and the type of the user equipment.

16. An eNB, comprising:

a non-transitory computer readable storage medium;

a processor coupled to the non-transitory computer readable storage medium, executing:

a configuration module to allocate discovery signal resources to a user equipment, wherein the discovery signal resources comprise time-frequency domain resources used for sending a discovery signal, and/or code sequence resources used for sending a discovery signal; and a transceiving module to notify the user equipment of the discovery signal resources allocated to the user equipment;

wherein the discovery signal resources allocated by the configuration module to the user equipment at least comprise one or more of following:

different discovery signal resources allocated according to states of the user equipment;

different discovery signal resources allocated according to locations of the user equipment;

different discovery signal resources allocated according to application types of the user equipment; and different discovery signal resources allocated according to priorities of the user equipment;

the transceiving module notifies the user equipment of the discovery signal resources allocated to the user equipment by means of:

sending a discovery signal resource set by broadcasting; or allocating discovery signal resources to the user equipment through a dedicated signaling; or sending a discovery signal resource set by broadcasting, and after the user equipment makes a selection, performing coordination and confirmation; or sending a discovery signal resource set to the user equipment through a dedicated signaling, and after the user equipment selects discovery signal resources from the discovery signal resource set, performing coordination and confirmation; or sending a discovery signal resource set by broadcasting, and after the user equipment performs measurement with respect to discovery signal resources and makes a report after receiving the discovery signal resource set, selecting an appropriate discovery signal resource for the user equipment according to a measurement result of the user equipment; or sending a discovery signal resource set to the user equipment through a dedicated signaling, and after the user equipment performs measurement with respect to discovery signal resources and makes a report after receiving the discovery signal resource set, selecting an appropriate discovery signal resource for the user equipment according to a measurement result of the user equipment; or allocating discovery signal resources to the user equipment by means of combining a broadcast and a dedicated signaling;

the transceiving module allocates the discovery signal resources to the user equipment by means of combining a broadcast and a dedicated signaling by means of:

the transceiving module broadcasting a discovery signal resource set, and in a set condition, allocating discovery signal resources to the user equipment through a dedicated signaling; or the transceiving module broadcasting a discovery signal resource set, and allocating a discovery signal resource sequence number indication to the user equipment through a dedicated signaling, so as to instruct the user equipment to obtain discovery signal resources allocated to the present user equipment from the discovery signal resource set according to a sequence number;

the transceiving module is further configured to: receive a resource request sent by the user equipment and/or other eNBs, wherein the resource request comprises the capability of the user equipment and the type of the user equipment; and the configuration module is configured to: after receiving the resource request, allocate discovery signal resources to the user equipment.

17. The eNB according to claim 16, wherein, the configuration module allocates discovery signal resources according to the states of the user equipment, wherein the discovery signal resources comprise: GROUP A resources and GROUP B resources, wherein, the GROUP A resources are discovery signal resources allocated by the eNB to a user equipment in a connected state for use; and the GROUP B resources are discovery signal resources allocated by the eNB to a user equipment in an idle state for use;

the configuration module further dynamically adjusts resources in a GROUP A resource pool and a GROUP B resource pool, comprising: adjusting the quantity of resources in respective resource pool of the GROUP A resource pool and the GROUP B resource pool, and adjusting the intercombination of time-frequency and/or code resources of resources in resource pools.

18. The eNB according to claim 17, wherein, the configuration module, according to different locations of a user equipment in a connected state in a cell, allocates different GROUP A resources;

wherein, the eNB allocates a cell-edge GROUP A resource to a user equipment in a connected state located in a cell-edge area; and the eNB allocates a cell-center GROUP A resource to a user equipment in a connected state located in a cell-center area;

the configuration module is configured to allocate a cell-edge GROUP A resource different from a cell-edge GROUP A resource in an edge area of a neighboring cell of a cell to the user equipment in the connected state located in the cell-edge area;

the configuration module is configured to: when a user equipment in a connected state moves to a different cell area, reallocate GROUP A resources belonging to the cell area to the user equipment in the connected state;

the configuration module is configured to dynamically adjust resources of various cell-edge GROUP A resource pools and cell-center GROUP A resource pools in the GROUP A resources, comprising: adjusting the quantity of resources in various cell-edge GROUP A resource pools and cell-center GROUP A resource pools, and adjusting the intercombination of time-frequency and/or code resources of resources in resource pools;

the configuration module is configured to: when allocating the GROUP A resources, firstly allocate discovery signal resources to a user equipment in a connected state with a high priority;

the configuration module is configured to allocate GROUP A resources used by a user equipment in a connected state with a low priority to the user equipment in the connected state with the high priority;

the configuration module is configured to: when allocating the GROUP A resources, allocate a service life of the discovery signal resources and a usage pattern of the discovery signal according to the application types of the user equipment;

wherein, the service life of the discovery signal resources is a duration that the GROUP A resources can be used by the user equipment;

the usage pattern of the discovery signal comprises a period of sending the discovery signal, a specific start location or a start and offset location and valid time of continuous sending; or the usage pattern of the discovery signal comprises related information of deducing the usage pattern of the discovery signal;

the configuration module is configured to: when the user equipment sends an indication that a service life of the used GROUP A resources expires, instruct the user equipment to release the used GROUP A resources, and allocate the GROUP A resources to other user equipments;

or, when the user equipment proposes a renewal application to the present eNB, perform processing on the renewal application; and the processing performed by the configuration module on the renewal application comprises agreeing a renewal, replacing resources and releasing resources;

the transceiving module is further configured to instruct the user equipment to release the used GROUP A resources in any one of following cases:

a location area in which the user equipment is located is changed, discovery signal resources are insufficient, and an interference problem exists in usage of the discovery signal resources;

the transceiving module is further configured to receive a message request of releasing the GROUP A resources in advance sent by the user equipment; and the configuration module is further configured to: after the present eNB receives the message request, allocate the GROUP A resources to other user equipments.

19. The eNB according to claim 17, wherein, the configuration module allocates a resource set of a GROUP B resource pool to the user equipment in the idle state;

the transceiving module sends GROUP B resource set information to the user equipment in the idle state belonging to a cell by broadcasting;

the configuration module presets a usage pattern of the discovery signal in the GROUP B resources;

the usage pattern of the discovery signal comprises a period of sending the discovery signal, a specific start location or a start and offset location and valid time of continuous sending; or the usage pattern of the discovery signal comprises related information of deducing the usage pattern of the discovery signal.

* * * * *